US008237701B2

(12) United States Patent
Hwang

(10) Patent No.: US 8,237,701 B2
(45) Date of Patent: Aug. 7, 2012

(54) VIDEO DISPLAY CAPABLE OF COMPENSATING FOR DISPLAY DEFECTS

(75) Inventor: Jong Hee Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 826 days.

(21) Appl. No.: 12/318,157

(22) Filed: Dec. 22, 2008

(65) Prior Publication Data

US 2009/0303227 A1 Dec. 10, 2009

(30) Foreign Application Priority Data

Jun. 4, 2008 (KR) ........................ 10-2008-0052628

(51) Int. Cl.
*G06F 3/038* (2006.01)
*G09G 5/00* (2006.01)

(52) U.S. Cl. ........................................................ 345/214

(58) Field of Classification Search ................... 345/214
See application file for complete search history.

(56) References Cited

U.S. PATENT DOCUMENTS

| | | | | |
|---|---|---|---|---|
| 5,175,815 | A * | 12/1992 | Wada | 345/555 |
| 6,209,078 | B1 * | 3/2001 | Chiang et al. | 712/36 |
| 6,362,834 | B2 * | 3/2002 | Ishii | 345/690 |
| 6,603,451 | B1 * | 8/2003 | Mergler et al. | 345/87 |
| 7,081,901 | B1 * | 7/2006 | Ludden et al. | 345/596 |
| 7,256,794 | B2 * | 8/2007 | Myoung et al. | 345/596 |
| 2002/0075215 | A1 * | 6/2002 | Willis | 345/89 |
| 2006/0145975 | A1 * | 7/2006 | Kempf et al. | 345/84 |
| 2006/0256100 | A1 * | 11/2006 | Masuji et al. | 345/204 |
| 2007/0229420 | A1 * | 10/2007 | Hwang | 345/87 |
| 2007/0273626 | A1 * | 11/2007 | Kerofsky et al. | 345/87 |

FOREIGN PATENT DOCUMENTS

| | | | |
|---|---|---|---|
| JP | 9-318929 | A | 12/1997 |
| JP | 2003-280619 | A | 10/2003 |
| JP | 2006-58870 | A | 3/2006 |
| JP | 2006-84729 | A | 3/2006 |
| JP | 2006-106120 | A | 4/2006 |
| JP | 2008-257186 | A | 10/2008 |

OTHER PUBLICATIONS

Texas_Instruments_Datasheet_SCLS112D.*

(Continued)

*Primary Examiner* — Alexander S Beck
*Assistant Examiner* — Joseph Pena
(74) *Attorney, Agent, or Firm* — Morgan, Lewis & Bockius LLP

(57) ABSTRACT

A video display device includes a display panel; a memory storing defect information for compensating data to be displayed on defect regions of the display panel; a compensation circuit comprising a first compensator that compensates the data to be displayed on the defect regions using the defect information from the memory, and a second compensator that finely compensates the data compensated by the first compensator using a first dither pattern, the compensation circuit supplying data to be displayed on normal regions without compensation; a timing controller comprising a dithering unit for finely compensating data output from the compensation circuit, using a second dither pattern having a size larger that a size of the first dither pattern; and a panel driver for driving the display panel under a control of the timing controller.

12 Claims, 17 Drawing Sheets

OTHER PUBLICATIONS

Texas_Instruments_Datasheet_SDAS081C.*
Texas_Instruments_Datasheet_SCLS112D_Oct._2003.*
Texas_Instruments_Datasheet_SDAS081C_Dec._1994.*
Japanese Office Action dated Oct. 26, 2011.

* cited by examiner

1/4

2/4

3/4

4/4

VIDEO DISPLAY CAPABLE OF COMPENSATING FOR DISPLAY DEFECTS

This application claims the benefit of Korean Patent Application No. 10-2008-052628, filed on Jun. 4, 2008, which is hereby incorporated by reference as if fully set forth herein.

BACKGROUND OF THE INVENTION

1. Field of the Invention

The present invention relates to a video display device, and more particularly, to a video display device capable of applying a display defect compensation circuit thereof, and reducing noise caused by overlap of different dither patterns.

2. Discussion of the Related Art

Recently, for video display devices, flat display devices, such as a liquid crystal display (LCD), a plasma display panel (PDP), and an organic light emitting diode (OLED) display device, have mainly been used.

Such a video display device is subjected to an inspection process at a manufacture stage in which the manufacture of a display panel has been completed, to inspect display defects possibly existing on the display panel. When the display panel is detected as having display defects, a repair process is carried out to repair defected portions of the display panel. However, there may be display defects that cannot be repaired by the repair process.

Display defects are mainly caused by a deviation in exposure light amount resulting from the overlapped light exposure in a multi-exposure operation of exposure equipment used in a thin film pattern formation process and the aberrations of multi-lenses used in the exposure equipment. The deviation in exposure light amount causes a variation in the width of thin film patterns, thereby resulting in a deviation in parasitic capacity among thin film transistors, a deviation in height among column spacers to maintain a desired cell gap, a deviation in parasitic capacity among signal lines, etc. Such deviations cause a brightness deviation, thereby resulting in display defects. Such display defects incurred by the exposure light amount deviation are displayed on the display panel in the form of vertical lines or horizontal lines in accordance with the scanning direction of the exposure equipment. However, it is difficult or impossible to eliminate such vertical or horizontal-line-shaped display defects, even through an improvement in process techniques.

Furthermore, display defects may be displayed in the form of point defects at defective pixels containing foreign matter. Although such defective pixels are subjected to a repair process, they may still have point defects in the repaired state. For example, when a defective pixel is repaired in the form of a dark pixel by a repair process, the dark pixel may be displayed in the form of a black point defect on a white image. Also, when a repair process is performed such that the pixel repaired in the form of a dark pixel is linked to a neighboring normal pixel, the linked pixels may be displayed as point defects due to a shortage of data charge amount because data supplied to the normal pixel must be distributed even to the repaired pixel, in order to charge the normal pixel.

In the case of a liquid crystal display device, which uses a backlight unit, there is a tendency to reduce the spacing of a liquid crystal panel from the backlight unit, in order to achieve slimness. However, the diffusion path of light emitted from the backlight unit is insufficient, so that display defects in the form of horizontal lines corresponding to respective positions of a plurality of lamps may be displayed.

Methods for compensating for display defects through a circuit have recently been proposed to solve the above-mentioned display defects. For example, Korean Patent Application No. 10-2006-0059285 filed in the name of the inventors discloses a method for compensating data to be displayed in defective display regions by modulating the data by use of compensation data. The display defect compensation circuit used in this method uses a frame rate control (FRC) dithering circuit for spatially and temporally distributing compensated data, in order to finely adjust the brightness difference between the boundaries of the defective display region and the normal display region.

Generally, video display devices are internally equipped with a dithering circuit using a general dithering method or an FRC dithering method, in order to finely adjust brightness differences between grayscales.

In a display defect compensation circuit of the related art applied to a video display device, which uses a dithering circuit as mentioned above, however, noise such as horizontal or vertical lines may be generated due to a collision between a first dither pattern of the display defect compensation circuit and a second dither pattern of the dithering circuit.

Furthermore, the display defect compensation circuit of the related art requires different compensation data pieces in accordance with different input sources or different models, respectively. For this reason, where all compensation data pieces according to various input sources and various models are stored, an excessive increase in memory capacity occurs. In this case, there are problems of an increase in the load of the compensation circuit and an increased task complexity.

On the other hand, where separate compensation circuits are used in accordance with different input sources or different models, it is necessary to develop timing controllers respectively equipped with compensation circuits according to the different input sources or different models. In this case, the manufacturing costs increase. Also, various types of printed circuit boards (PCBs) are required. For this reason, the management of the timing controller and PCB is complicated.

SUMMARY OF THE INVENTION

Accordingly, the present invention is directed to a video display device capable of compensating for display defects that substantially obviates one or more problems due to limitations and disadvantages of the related art.

An object of the present invention is to provide a video display device capable of applying a display defect compensation circuit thereof to any model.

Another object of the present invention is to provide a video display device capable of reducing noise caused by overlap of different dither patterns.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video display device includes a display panel; a memory storing defect information for compensating data to be displayed on defect regions of the display panel; a compensation circuit comprising a first compensator that compensates the data to be displayed on the defect regions using the defect information from the memory, and a second compensator that finely compensates the data compensated by the first compensator using a first dither pattern, the compensation circuit supplying data to be displayed on normal regions without compensation; a timing controller comprising a dithering unit for finely compensating data output from the compensation circuit, using a second dither pattern having a size larger that a size of the first dither pattern; and a panel driver for driving the display panel under a control of the timing controller.

The second compensator of the compensation circuit may execute a first dithering operation for N-bit input data ("N" is a positive integer), using a dither pattern having a 1*1 pixel size as the first dither pattern, thereby outputting "N−1"-bit data reduced from the N-bit input data by a lowermost-order 1 bit. The dithering unit of the timing controller may execute a second dithering operation for the "N−1"-bit data, using a dither pattern having a 4*4 pixel size as the second dither pattern, thereby outputting "N−3"-bit data reduced from the "N−1"-bit data by lowermost-order 2 bits, and may determine a compensation value in accordance with a combination of second dither patterns respectively selected in adjacent two frames.

In another aspect of the present invention, a video display device comprises: a display panel; a memory storing typical defect information used to compensate data to be displayed on typical defect regions of the display panel; a compensation circuit comprising a first compensator for compensating the data to be displayed on the typical defect regions, using the typical defect information from the memory, and a second compensator for finely compensating the data compensated by the first compensator, using a first dither pattern selected from different first dither patterns in response to dithering-ON/OFF information, the compensation circuit supplying data to be displayed on normal regions, without compensation; a timing controller comprising a dithering unit for finely compensating data output from the compensation circuit, using a second dither pattern having a size larger that a size of the first dither pattern, and a multiplexer for selecting an output from the dithering unit or an output from the compensation circuit in response to the dithering-ON/OFF information; and a panel driver for driving the display panel under a control of the timing controller.

In another aspect of the present invention, a video display device comprises: a display panel; a memory storing typical defect information used to compensate data to be displayed on typical defect regions of the display panel; a compensation circuit comprising a bit expander for bit-expanding input data pieces respectively having different numbers of bits such that the input data pieces have the same number of bits, in accordance with control information including input source information and dithering-ON/OFF information, and outputting the resultant data, a first compensator for compensating the data input from the bit expander to be displayed on the typical defect regions, using the control information, and a second compensator for finely compensating the data compensated by the first compensator, using a first dither pattern selected from different first dither patterns in response to dithering-ON/OFF information, the compensation circuit supplying data to be displayed on normal regions, without compensation; a timing controller comprising a dithering unit for finely compensating data output from the compensation circuit, using a second dither pattern having a size larger that a size of the first dither pattern, and a multiplexer for selecting an output from the dithering unit or an output from the compensation circuit in response to the dithering-ON/OFF information; and a panel driver for driving the display panel under a control of the timing controller.

The bit expander may comprise: a first bit expander for expanding 8-bit input data received from an outside of the device from 8 bits to 13 bits by adding 2 bits ("00") to the 8-bit input data before an uppermost-order bit of the 8-bit input data, and adding 3 bits ("000") to the 8-bit input data after a lowermost-order bit of the 8-bit input data; a second bit expander for expanding 10-bit input data received from the outside of the device from 10 bits to 13 bits by adding 3 bits ("000") to the 10-bit input data after a lowermost-order bit of the 10-bit input data; a third bit expander for expanding 10-bit input data received from the outside of the device from 10 bits to 13 bits by adding 2 bits ("00") to the 10-bit input data before an uppermost-order bit of the 10-bit input data, and adding 1 bit ("0") to the 10-bit input data after a lowermost-order bit of the 10-bit input data; and a multiplexer for selecting an output from the first bit expander when the control information represents a 8-bit input source, selecting an output from the second bit expander when the control information represents a 10-bit input source, and selecting an output from the third bit expander when the control information represents the 10-bit input source and a dithering-ON state.

The first compensator may comprise: a data input unit for selecting, from the 13-bit data input from the bit expander, 8-bit effective data to be used for a grayscale range discrimination, and outputting the selected effective data; a grayscale determiner for selecting grayscale range information corresponding to the effective data from the data input unit, using grayscale range information included in the typical defect information stored in the memory, and outputting the selected grayscale range information; a position determiner for outputting position information as to a defect region corresponding to the input data and a number of detected typical defect regions, in accordance with defect region position information from the memory and typical defect direction information input through an option pin from the memory or from the outside of the device; a compensation data selector for selecting compensation data corresponding to the input data from among compensation data for defect regions stored in the memory, using the grayscale range information output from the grayscale determiner and the position information output from the position determiner, bit-expanding the selected compensation data, and outputting the bit-expanded compensation data; an adder for adding the compensation data output from the compensation data selector to the input data output from the bit expander; a subtractor for subtracting the compensation data output from the compensation data selector to the input data output from the bit expander; a first multiplexer for selectively outputting typical region order information and contrast information stored in the memory in accordance with the number of detected typical defect regions output from the position determiner; and a second multiplexer for selecting an output from the adder or an output from the subtractor in accordance with the typical defect region order information and the contrast information selected by the first multiplexer.

When the control information represents the 8-bit input source or the dithering-ON state, the compensation data selector may add 2 bits ("00") to the compensation data after an uppermost-order bit of the compensation data, and may output the resultant compensation data. When the control information represents the 10-bit input source, the compensation data selector may add 2 bits ("00") to the compensation data before a lowermost-order bit of the compensation data, and may output the resultant compensation data.

The second compensator of the compensation circuit may comprise: a first dithering unit for executing a dithering operation for N-bit input data ("N" is a positive integer)

received from the first compensator, using a dither pattern having a 8*32 pixel size as the first dither pattern, thereby outputting "N−3"-bit data reduced from the N-bit input data by lowermost-order 3 bits; a second dithering unit for executing a dithering operation for the N-bit input data received from the first compensator, using a dither pattern having a 1*1 pixel size as the first dither pattern, thereby outputting "N−1"-bit data reduced from the N-bit input data by a lowermost-order 1 bit; and a multiplexer for selecting an output from the first dithering unit when the dithering-ON/OFF information representing whether the timing controller is in a dithering-ON state or a dithering-OFF state represents the dithering-OFF state of the timing controller, and selecting an output from the second dithering unit when the dithering-ON/OFF information represents the dithering-ON state of the timing controller. The dithering unit of the timing controller may execute a second dithering operation for the "N−1"-bit data, using a dither pattern having a 4*4 pixel size as the second dither pattern, thereby outputting "N−3"-bit data reduced from the "N−1"-bit data by lowermost-order 2 bits, and may determine a compensation value in accordance with a combination of second dither patterns respectively selected in adjacent two frames.

The memory may further store point defect information as to point defect regions of the display panel. The compensation circuit may further comprise a third compensator for compensating data input from the second compensator, using the point defect information from the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
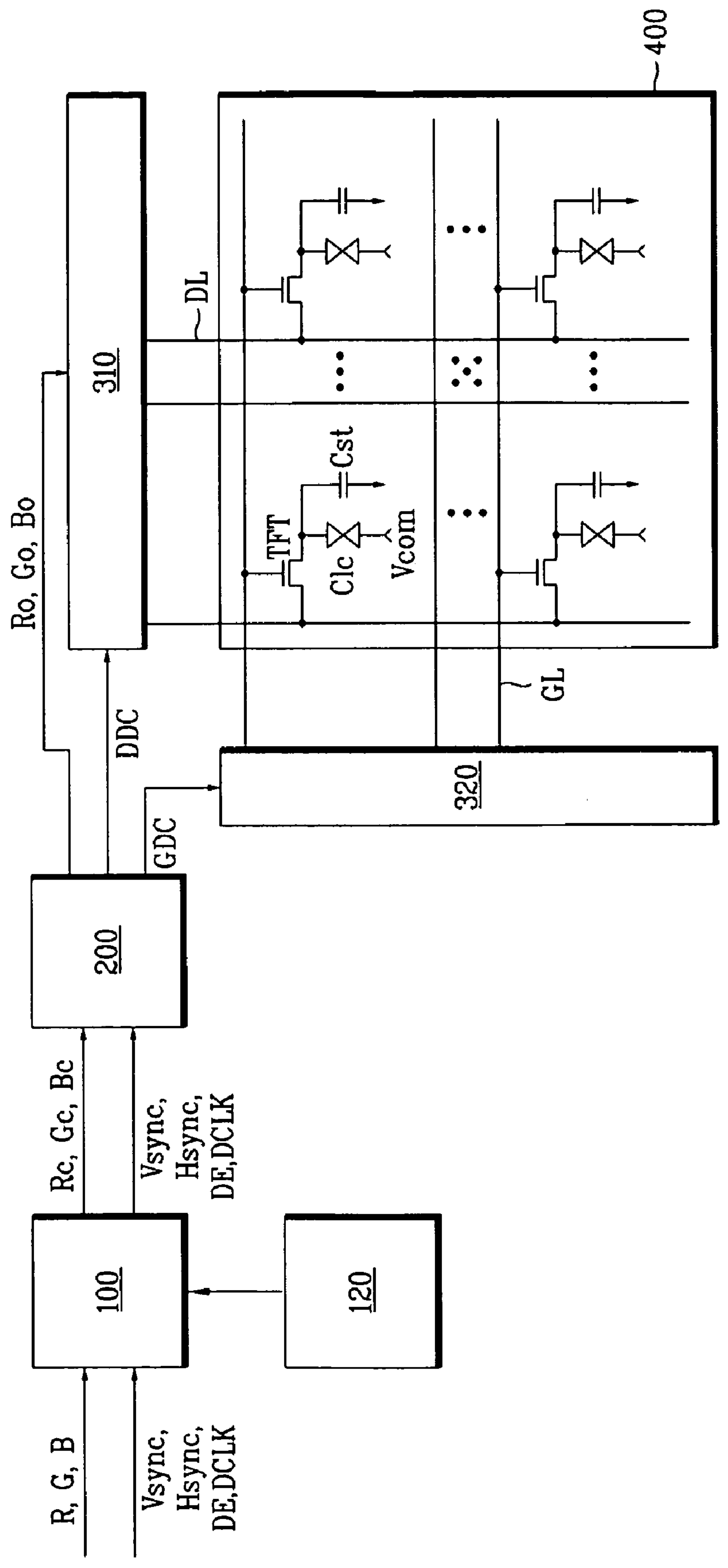
FIG. 1 is a block diagram showing an exemplary LCD device according to a first embodiment of the present invention.

FIG. 1 is a block diagram showing an exemplary LCD device according to a first embodiment of the present invention. The LCD device shown in FIG. 1 includes a compensation circuit 100 and a timing controller 200. The LCD device also includes a data driver 310 and a gate driver 320, which function to drive a liquid crystal panel 400. The LCD device further includes a memory 120 connected to the compensation circuit 100. The compensation circuit 100 may be implemented in the form of one semiconductor chip, together with the timing controller 200.

In the memory 120, typical defect information is stored. The typical defect information includes position information PD1, grayscale range information GD1, and compensation data CD1 as to typical defect regions having defects such as vertical line defects and/or horizontal line defects. The position information PD1 as to each typical defect region includes start position information and end position information as to the defect region each represented by a corresponding number of pixels. For example, the position information PD1 of each typical defect region includes numbers of pixels respectively representing start position information and end position information as to each of the main region included in the typical defect region and the divisional areas of each boundary region included in the typical defect region. The grayscale range information GD1 includes information as to a plurality of grayscale ranges divided in accordance with gamma characteristics. The compensation data CD1 is used to compensate for a brightness difference or color difference of the defect region from the normal region. The compensation data CD1 is stored after being sorted in accordance with the corresponding grayscale range and the position of the corresponding defect region. The compensation data CD1 for each typical defect region includes compensation values respectively optimized for the main region of the typical defect region and the divisional areas of each boundary region of the typical defect region. The grayscale range information GD1 includes information as to a plurality of grayscale ranges divided in accordance with gamma characteristics. The memory 120 also stores point defect information including position information PD2, grayscale range information GD2, and compensation data CD2 as to point defect regions.

The compensation circuit 100 receives data R, G, and B input from the outside of the LCD device, and receives a plurality of synchronizing signals Vsync, Hsync, DE, and DCLK. The compensation circuit 100 compensates data to be displayed on a typical defect region, using the information PD1, GD1, CD1 ST1 stored in the external memory 120 as to the typical defect region, such as a horizontal line or a vertical line, and outputs the compensated data. The compensation circuit 100 expands the number of bits of the input data, and applies the expanded bit number as compensation data. The compensation circuit 100 executes the data compensation under the condition in which the typical defect region is divided into a main region and boundary regions. Thereafter, the compensation circuit 100 finely compensates the compensated data by spatially and temporally distributing the compensated data in accordance with a frame rate control (FRC) dithering method. In particular, where a separate dithering circuit is built in the timing controller 200, the compensation circuit 100 uses a dither pattern set to prevent the dither pattern of the compensation circuit 100 from colliding with the dither pattern of the timing controller 200. For example, the compensation circuit 100 uses a first dither pattern having a 1*1 pixel size, and the timing controller 200 uses a second dither pattern having a 4*4 pixel size. The effects of the fine brightness compensation according to the first and second dithering operations of the compensation circuit 100 and timing controller 200 are exhibited in the form of a combination of second dither patterns respectively added to first and second frames in the timing controller 200 in accordance with the grayscale level of the input data and the dither value of the first dither pattern added in the compensation circuit 100. Thus, the second dither value, which will be added in the timing controller 200, is varied in accordance with the first dither value added in the compensation circuit 100. Accordingly, it is possible to prevent a collision between the first and second dither patterns. This will be described in detail later. The compensation circuit 100 also compensates data to be displayed on a point defect region, using the information PD2, GD2, and CD2 stored in the external memory as to the point defect region, and outputs the compensated data. The compensation circuit 100 then supplies the compensated data, namely, data Rc, Gc, and Bc, to the timing controller 200, together with the synchronizing signals Vsync, Hsync, DE, and DCLK. The compensation circuit 100 supplies, to the timing controller 200, data to be displayed on normal regions, without compensating the data.

The timing controller 200 executes a fine brightness compensation for the output data Rc, Gc, and Bc from the compensation circuit 100 in accordance with a dithering operation using the second dither pattern having a 4*4 pixel size. The timing controller 200 then arranges the data reduced in bit number in accordance with the dithering operation, and outputs the resultant data to the data driver 310. The timing controller 200 executes a fine brightness compensation for both the data to be displayed on defect regions and the data to be displayed on normal regions, through the dithering operation. This will be described in detail later. Using the synchronizing signals Vsync, Hsync, DE, and DCLK, the timing controller 200 also generates a data control signal DDC to control the driving timing of the data driver 310 and a gate control signal GDC to control the driving timing of the gate driver 320. The timing controller 200 then outputs the data control signal DDC and gate control signal GDC.

In response to the data control signal DDC from the timing controller 200, the data driver 310 converts digital data received from the timing controller 200, namely, data Ro, Go, and Bo, to analog data, using gamma voltages. The data driver 310 outputs the analog data to data lines of the liquid crystal panel 400.

In response to the gate control signal GDC from the timing controller 200, the gate driver 320 sequentially drives gate lines of the liquid crystal panel 400.

The liquid crystal panel 400 displays an image through a pixel matrix on which a plurality of pixels are arranged. Each pixel renders a desired color, using a combination of red, green, and blue sub-pixels adjusting a light transmittance through a variation in the alignment of liquid crystals according to a data signal. Each sub-pixel includes a thin film transistor (TFT) coupled to one gate line GL and one data line DL. Each sub-pixel also includes a liquid crystal capacitor Clc and a storage capacitor Cst coupled to the TFT in parallel. The liquid crystal capacitor Clc is charged with a differential voltage between the data signal supplied to a pixel electrode via the TFT and a common voltage Vcom supplied to a common electrode, to drive liquid crystals in accordance with the charged voltage, and thus to adjust the light transmittance of the sub-pixel. Horizontal or vertical-line-shaped typical defect regions and point defect regions, which may be included in the liquid crystal panel 400 due to manufacture processes used, display data compensated by the compensation circuit 100. As a result, it is possible to avoid a brightness difference between a normal region and a defect region, and thus to achieve an enhancement in display quality.

Figure 2:
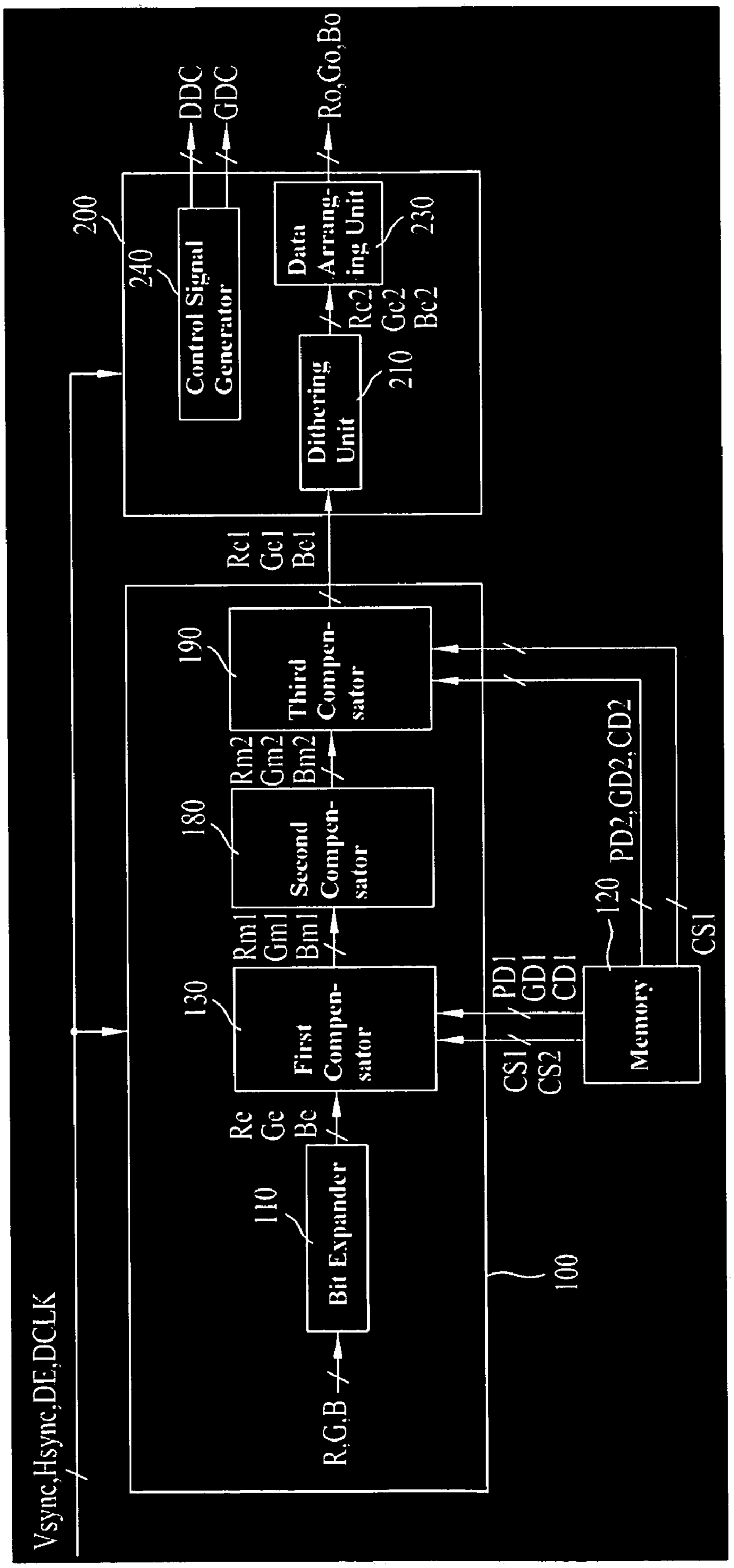
FIG. 2 is a block diagram showing exemplary configurations of a compensation circuit and a timing controller shown in FIG. 1.

FIG. 2 is a block diagram showing exemplary configurations of a compensation circuit and a timing controller shown in FIG. 1. As shown in FIG. 2, the compensation circuit 100 includes a bit expander 110, a first compensator 130 for compensating data of a typical defect region included in data Re, Ge, and Be input from the bit expander 110, a second compensator 180 for finely compensating the compensated data input from the first compensator 130, namely data Rm1, Gm1, and Bm1, and a third compensator 190 for compensating data of a point defect region included in data Rm2, Gm2, and Bm2 output from the second compensator 180. The timing controller 200 includes a dithering unit 210 for finely compensating data Rc1, Gc1, and Bc1 input from the compensation circuit 100 in accordance with a second dithering method, a data arranging unit 230 for re-arranging data Rc2, Gc2, and Bc2 input from the dithering unit 210, and outputting the resultant data to the data driver 310 shown in FIG. 1, and a control signal generator 240 for generating the data control signal DDC and the gate control signal GDC, and outputting the generated data control signal DDC and gate control signal GDC to the data driver 310 and gate driver 320, respectively.

The memory 120 stores the typical defect information PD1, CD1, and GD1, and the point defect information PD2, CD2, and GD2 therein. In detail, the memory 120 stores vertical line defect region information or horizontal line defect region information for the typical detect information PD1, CD1, and GD1. The memory 120 may also store first control information CS1 including typical defect direction information representing whether the defect type of a typical defect region is a vertical line defect or a horizontal line defect, typical defect compensation requirement/non-requirement information representing whether or not there is a typical defect region, and thus representing whether or not a compensation for a typical defect region is required, and point defect compensation requirement/non-requirement information representing whether or not a compensation for a point defect region is required. For example, respective bits of 3-bit data in one byte allocated for the first control information CS1 may represent typical defect direction information, typical defect compensation requirement/non-requirement information, and point defect compensation requirement/non-requirement information. The first control information CS1 may be set by values of three option pins included in the timing controller 200, in which the compensation circuit 100 is built. The memory 120 may store second control information CS2 including typical defect region contrast information representing whether the typical defect region is brighter or darker than the normal region, together with information as to the order of typical defect regions.

The bit expander 110 of the compensation circuit 100 bit-expands input data R, G, and B received from the outside of the LCD device, and supplies the bit-expanded data to the first compensator 130. For example, the bit expander 110 adds one bit ("0") to the lowermost-order bit of 10-bit input data, to bit-expand the input data to 11-bit data. The bit expander 110 then supplies the 11-bit data, namely, the data Re, Ge, and Be, to the first compensator 130.

The first compensator 130 compensates the input data Re, Ge, and Be, which will be displayed on a typical defect region having defects such as vertical line defects or horizontal line defects, using the typical defect information PD1, GD1, and CD1 stored in the memory 120, and outputs the compensated data. The first compensator 130 reads the typical defect information PD1, GD1, and CD1 from the memory 120, to determine whether or not the input data Re, Ge, and Be will be displayed on a typical defect region. When it is determined that the input data Re, Ge, and Be will be displayed on a typical defect region, the first compensator 130 discriminates information as to respective grayscale ranges for the input data Re, Ge, and Be. Thereafter, the first compensator 130 selects compensation data corresponding to the discriminated grayscale range information. The first compensator 130 then executes a data compensation by adding or subtracting the selected compensation data to or from the input data Re, Ge, and Be. Thus, the first compensator 130 compensates the input data Re, Ge, and Be for the typical defect region, and outputs the compensated data. For example, the first compensator 130 adds or subtracts, to or from each of the 11-bit input data Re, Ge, and Be for the typical defect region, the corresponding 8-bit compensation data, and outputs the compensated data. The first compensator 130 outputs data for normal regions without any compensation. A detailed configuration of the first compensator 130 will be described later.

The second compensator 180 finely compensates the brightness values of the compensated data Rm1, Gm1, and Bm1 output from the first compensator 130 by temporally distributing the data Rm1, Gm1, and Bm1, using a first dithering method. For example, the second compensator 180 uses the first dither pattern capable of preventing a collision thereof with the second dither pattern of the dithering unit 210 built in the timing controller 200, namely, a dither pattern having a 1*1 pixel size. The first dither pattern has a dither value of "1" or "0". The dither values of "1" and "0" alternate by frames. Accordingly, the second compensator 180 discards the lowermost-order bit in the 11 bits of each of the data Rm1, Gm1, and Bm1 in a first frame, and then adds a first dither value of "1" or "0" to the lowermost-order bit of the remaining 10 bits. Thus, the second compensator 180 outputs compensated data Rm2, Gm2, and Bm2 each consisting of 10 bits. In a second frame, the second compensator 180 discards the lowermost-order bit of the 11 bits, adds a first dither value reciprocal to that of the first frame to the lowermost-order bit of the remaining 10 bits, and then outputs compensated data Rm2, Gm2, and Bm2 each consisting of 10 bits. As a result, the 10-bit data output in the first frame and the 10-bit data in the second frame have a grayscale level difference of "1" when the lowermost-order bit of the 11-bit input data has an odd grayscale level of "1". On the other hand, the 10-bit data output in the first frame and the 10-bit data in the second frame have the same grayscale level when the lowermost-order bit of the 11-bit input data has an even grayscale level of "0". A detailed configuration of the second compensator 180 will be described later.

The third compensator 190 compensates the data Rm2, Gm2, and Bm2, which will be displayed on a point defect region, using the point defect information PD2, GD2, and CD2 stored in the memory 120. For data of normal regions, the third compensator 190 outputs the data without any data compensation. A detailed configuration of the third compensator 190 will be described later.

The dithering unit 210 of the timing controller 200 executes fine brightness compensation by spatially and temporally distributing the data Rc1, Gc1, and Bc1 input from the compensation circuit 100 in accordance with the second dithering method. For example, the second dithering unit 210 uses a second dither pattern capable of preventing a collision thereof with the first dither pattern of the second compensator 180 built in the compensation circuit 100, namely, a dither pattern having a 4*4 pixel size. The second dither pattern includes 4 dither patterns respectively having different numbers of pixels having a dither value of "1" and different pixel positions in accordance with grayscale levels of "1/4", "2/4", "3/4", and "4/4". The dithering unit 210 separates the 10 bits of each of the data Rc1, Gc1, and Bc1 input from the compensation circuit 100 into the lower-order 2 bits and the remaining 8 bits. Thereafter, the dithering unit 210 selects a second dither value of "1" or "0" from the second dither pattern selected in accordance with the grayscale level of the separated lower-order 2 bits, and adds the selected second dither value to the lowermost-order bit of the remaining 8 bits. Thus, the dithering unit 210 outputs compensated data Rc2, Gc2, and Bc2 each consisting of 8 bits.

When the 10-bit data output in the first frame and the 10-bit data in the second frame have a grayscale level difference of "1" because the data input to the second compensator 180 of the compensation circuit 100 has an odd grayscale level of "1", the lower-order 2 bits of the data input to the dithering unit 210 in the first frame is different from that of the second frame. In this case, accordingly, dither values are selected from second dither patterns corresponding to the grayscale levels of the two different lower-order 2 bits, respectively. Thus, the dithering unit 210 executes fine brightness compensation, using a combination of the second dither pattern selected in the first frame and the second dither pattern selected in the second frame.

The data arranging unit 230 arranges the data Rc2, Gc2, and Bc2 output from the dithering unit 210, and outputs the arranged data, namely, data Ro, Go, and Bo, to the data driver 310 shown in FIG. 1.

The control signal generator 240 generates the data control signal DDC and the gate control signal GDC, and outputs the generated data control signal DDC and gate control signal GDC to the data driver 310 and gate driver 320, respectively.

Figure 3:
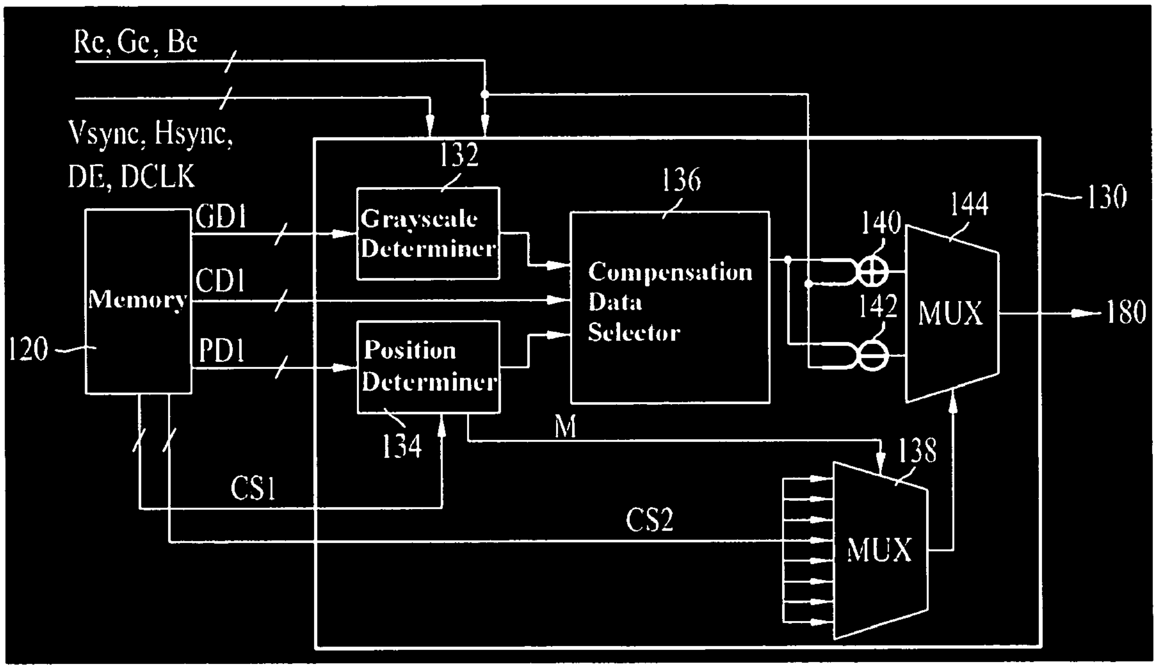
FIG. 3 is a block diagram showing an exemplary configuration of a first compensator shown in FIG. 2.
Figure 4:
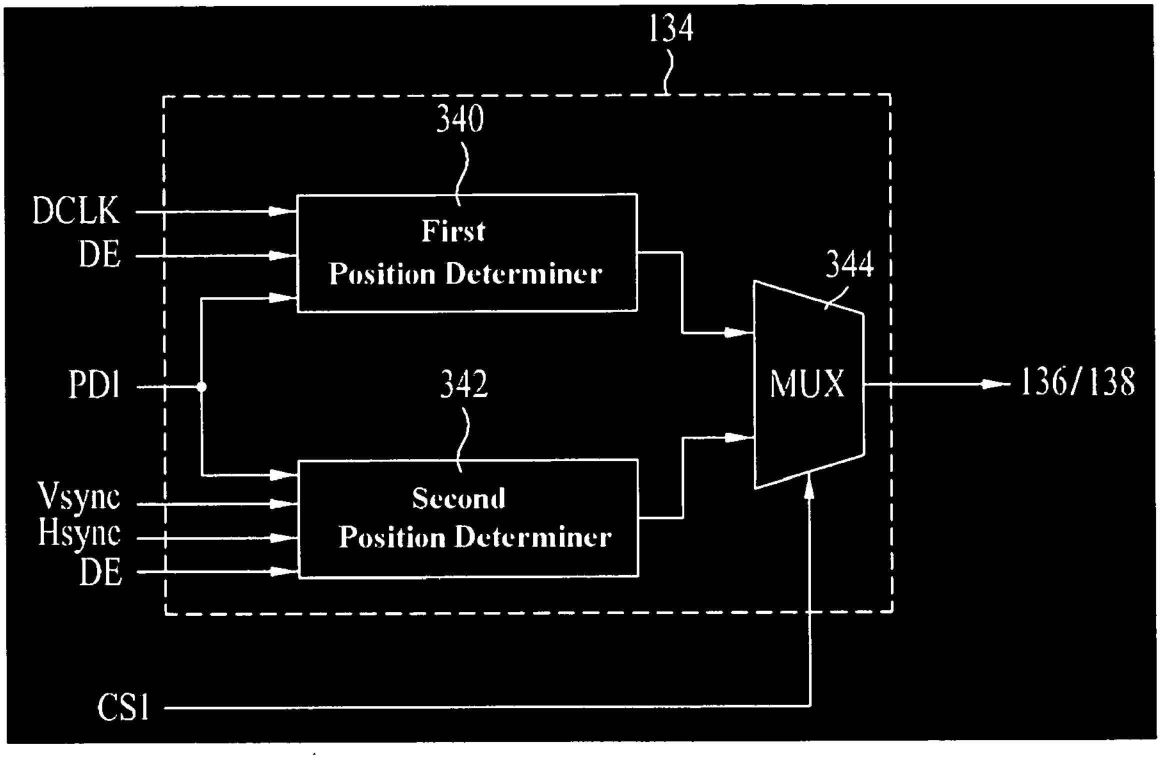
FIG. 4 is a block diagram of an exemplary position determiner shown in FIG. 3.

FIG. 3 is a block diagram showing an exemplary configuration of a first compensator shown in FIG. 2. FIG. 4 is a block diagram of an exemplary position determiner shown in FIG. 3. As shown in FIG. 3, the first compensator 130 compensates the input data Re, Ge, and Be, which will be displayed on a typical defect region having defects such as vertical line defects or horizontal line defects, using the typical defect information PD1, GD1, and CD1 stored in the memory 120, and outputs the compensated data. For this function, the first compensator 130 includes a grayscale determiner 132, a position determiner 134, a compensation data selector 136, an adder 140, a subtractor 142, and multiplexers (MUXs) 138 and 144. As shown in FIG. 4, the position determiner 134 includes a first position determiner 340, a second position determiner 342, and an MUX 344.

The grayscale determiner 132 analyzes respective grayscale levels of the input data Re, Ge, and Be, selects grayscale range information corresponding to the input data Re, Ge, and Be from among the grayscale range information GD1 read from the memory 120, based on the analyzed grayscale levels, and outputs the selected grayscale range information to the compensation data selector 136. For example, the grayscale range information GD1 may include 6 grayscale range information pieces respectively corresponding to 6 grayscale ranges divided from a 256 grayscale range in accordance with gamma characteristics (a first grayscale range from 30 to 70, a second grayscale range from 71 to 120, . . . ). The grayscale determiner 132 selects grayscale range information including respective grayscale levels of the input data Re, Ge, and Be from among the 6 grayscale range information pieces, and outputs the selected grayscale range information.

The position determiner 134 determines respective pixel positions of the input data Re, Ge, and Be in a horizontal direction or in a vertical direction, using at least one of the vertical synchronizing signal Vsync, horizontal synchronizing signal Hsync, data enable signal DE, and dot clock DCLK. In detail, as shown in FIG. 4, the position determiner 134 includes the first position determiner 340, which determines respective pixel positions of the input data Re, Ge, and Be in the horizontal direction, the second position determiner 342, which determines respective pixel positions of the input data Re, Ge, and Be in the vertical direction, and the MUX 344, which selects an output from the first position determiner 340 or an output from the second position determiner 342 in accordance with typical defect direction information included in the first control information CS1.

The first position determiner 340 determines respective horizontal pixel positions of the input data Re, Ge, and Be while counting pulses of the dot clock DCLK in an enable period of the data enable signal DE. The position determiner 340 then compares the determined horizontal pixel positions of the input data Re, Ge, and Be with the defect region position information PD1 read from the memory 120, to detect whether or not the defect region is a vertical line defect region. When the defect region is detected as a vertical line defect region, the position determiner 340 selects the position information corresponding to the defect region, and outputs the selected position information to the MUX 344. The first position determiner 340 also counts the number of detected vertical defect regions, M, and outputs the resultant information to the MUX 344.

The second position determiner 342 determines the vertical pixel positions of the input data Re, Ge, and Be while counting pulses of the horizontal synchronizing signal Hsync in a period in which both the vertical synchronizing signal Vsync and the data enable signal DE are enabled. The second position determiner 342 then compares the determined vertical pixel positions of the input data Re, Ge, and Be with the defect region position information PD1 read from the memory 120, to detect whether or not the defect region is a horizontal line defect region. When the defect region is detected as a horizontal line defect region, the second position determiner 342 selects the position information corresponding to the defect region, and outputs the selected position information to the MUX 344. The second position determiner 342 also counts the number of detected horizontal defect regions, M, and outputs the resultant information to the MUX 344.

In accordance with the typical defect direction information included in the first control information CS1, the MUX 344 supplies, to the compensation data selector 136, the typical defect region position information input from the first position determiner 340 or from the second position determiner 342. The MUX 344 also supplies the detected defect region number M to the MUX 138. That is, when the first control information CS1 represents a vertical line defect, the MUX 344 supplies the position information output from the first position determiner 340 to the compensation data selector 136, and supplies the detected defect region number M to the MUX 138. On the other hand, when the first control information CS1 represents a horizontal line defect, the MUX 344 supplies the position information output from the second position determiner 342 to the compensation data selector 136, and supplies the detected defect region number M to the MUX 138.

The compensation data selector 136 selects compensation data corresponding to each of the input data Re, Ge, and Be from among the compensation data CD1 read from the memory 120 in response to the grayscale range information selected by the grayscale determiner 132 and the position information selected by the position determiner 134. When the position information represents the main region of the typical defect region, the compensation data for compensating the main region is selected and output. On the other hand, when the position information represents the divisional areas of the boundary regions of the typical line defect region, the compensation data for compensating the divisional areas is selected and output.

The adder 140 adds the compensation data output from the compensation data selector 136 to the input data Re, Ge, and Be, and outputs the resultant data. The subtractor 142 subtracts the compensation data output from the compensation data selector 136 from the input data Re, Ge, and Be, and outputs the resultant data.

The MUX 138 sequentially outputs the contrast information as to typical defect regions in accordance with the order of the typical defect regions, to control the MUX 144, which selects the output from the adder 140 or the output from the subtractor 142. The typical defect region contrast information is stored in the memory 120, as second control information CS2, together with the typical defect region order information. The MUX 138 selects one second control information CS2 from among a plurality of second control information CS2 read from the memory 120, in accordance with the detected typical direction region number M output from the position determiner 134, and outputs the selected second control information CS2 to the MUX 144. The MUX 144 selects the output from the adder 140 or the output from the subtractor 142 in accordance with the contrast information included in the second control information CS2 supplied from the MUX 138.

Figure 5:
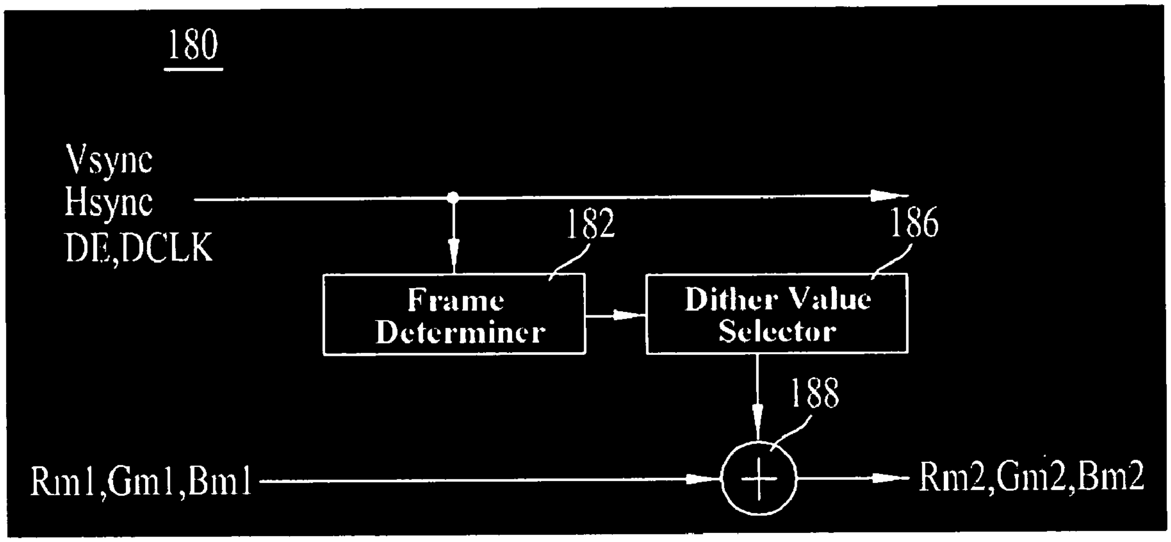
FIG. 5 is a block diagram of an exempary second compensator shown in FIG. 2.

FIG. 5 is a block diagram of an exempary second compensator shown in FIG. 2. As shown in FIG. 5, the second compensator 180 includes a frame determiner 182, a dither value selector 186, and an adder 188. The frame determiner 182 counts pulses of the vertical synchronizing signal Vsync selected from among a plurality of synchronizing signals, namely, the synchronizing signals Vsync, Hsync, DE, and DCLK, to detect whether the current frame is an odd frame or an even frame. The frame determiner 182 outputs information representing the detected frame to the dither value selector 186.

Figure 6:
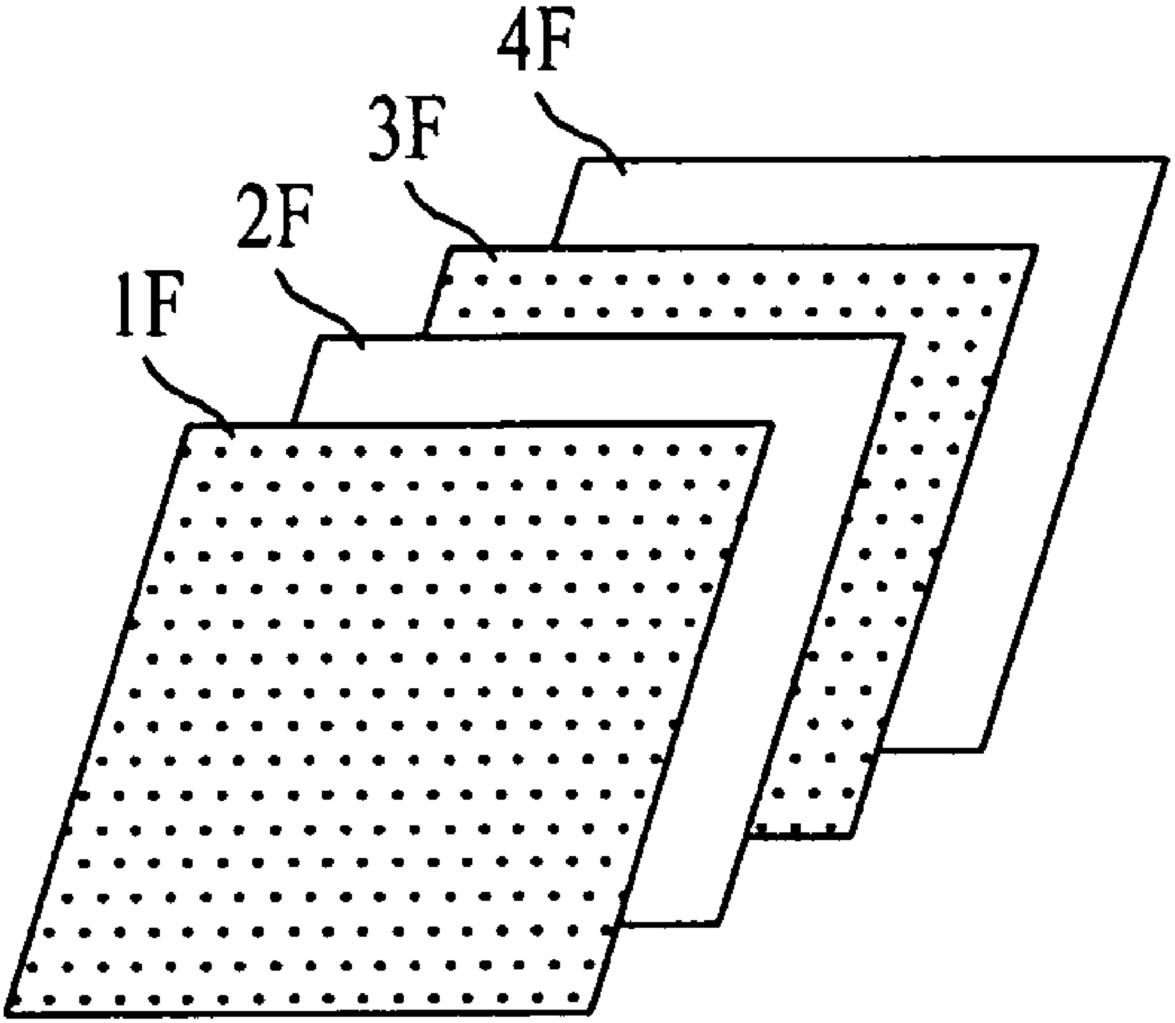
FIG. 6 is a schematic view illustrating first dither patterns of a 1*1 pixel size stored in a dither value selector shown in FIG. 5.

The dither value selector 186 selects a dither value of "1" or "0" from a first dither pattern, which has a 1*1 pixel size, as shown in FIG. 6, using the frame information input from the frame determiner 182, and outputs the selected dither value. The dither value selector 186 alternately outputs dither values of “1” and “0” by frames.

The adder 188 discards the lowermost-order bit from the 11 bits of each of the data Rm1, Gm1, and Bm1 input from the first compensator 130 in a first frame, and then adds, to the lowermost-order bit of the remaining 10 bits, a first dither value of “1” or “0”selected by the dither value selector 186. Thus, the adder 188 outputs 10-bit compensated data Rm2, Gm2, and Bm2. In a second frame, the adder 188 adds a first dither value reciprocal to that of the first frame, and then outputs 10-bit compensated data Rm2, Gm2, and Bm2. As a result, the 10-bit data output in the odd frame (first frame) and the 10-bit data in the even frame (second frame) have a grayscale level difference of “1” when the lowermost-order bit of the 11-bit input data has an odd grayscale level of “1”. On the other hand, the 10-bit data output in the first frame and the 10-bit data in the second frame have the same grayscale level when the lowermost-order bit of the 11-bit input data has an even grayscale level of “0”.

Figure 7:
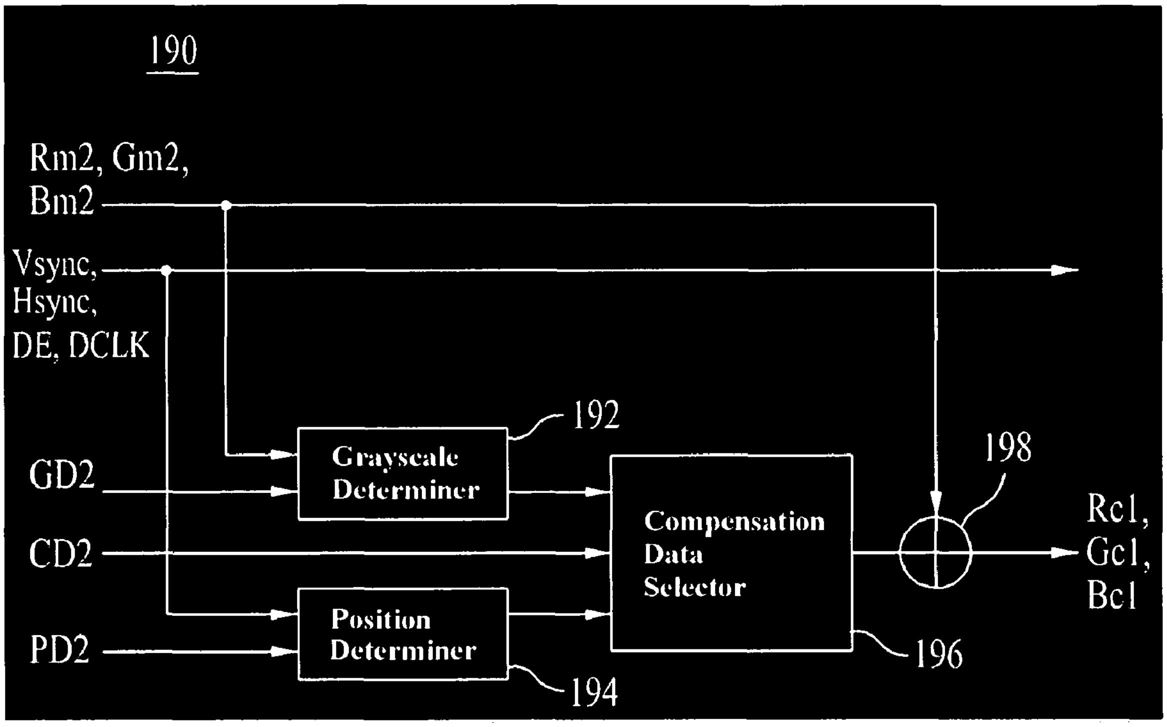
FIG. 7 is a block diagram of an exemplary third compensator shown in FIG. 2.

FIG. 7 is a block diagram of an exemplary third compensator shown in FIG. 2. As shown in FIG. 7, the third compensator 190 includes a grayscale determiner 192, a position determiner 194, a compensation data selector 196, and a calculator 198. The grayscale determiner 192 analyzes respective grayscale levels of the input data Rm2, Gm2, and Bm2 to be supplied to a link pixel of a point defect region, selects grayscale range information corresponding to the input data Rm2, Gm2, and Bm2 from among the grayscale range information GD2 read from the memory 120, based on the analyzed grayscale levels, and outputs the selected grayscale range information to the compensation data selector 196.

The position determiner 194 determines respective pixel positions of the input data Rm2, Gm2, and Bm2, using at least one of the vertical synchronizing signal Vsync, horizontal synchronizing signal Hsync, data enable signal DE, and dot clock DCLK. For example, the position determiner 194 determines respective horizontal pixel positions of the input data Rm2, Gm2, and Bm2 while counting pulses of the dot clock DCLK in an enable period of the data enable signal DE, and determines respective vertical pixel positions of the input data Rm2, Gm2, and Bm2 while counting pulses of the horizontal synchronizing signal Hsync in a period in which both the vertical synchronizing signal Vsync and the data enable signal DE are enabled. The position determiner 194 then compares the determined pixel positions of the input data Rm2, Gm2, and Bm2 with the point defect region position information PD2 read from the memory 120, to detect whether or not the defect region is a point defect region. When the defect region is detected as a point defect region, the position determiner 194 outputs information representing the determined pixel positions to the compensation data selector 196.

The compensation data selector 196 selects compensation data corresponding to each of the input data Rm2, Gm2, and Bm2 from among the compensation data CD2 read from the memory in response to the grayscale range information selected by the grayscale determiner 192 and the position information selected by the position determiner 194. The compensation data selector 196 then outputs the selected compensation data.

The calculator 198 adds or subtracts the compensation data output from the compensation data selector 196 to or from the input data Rm2, Gm2, and Bm2, and outputs the resultant data.

Figure 8:
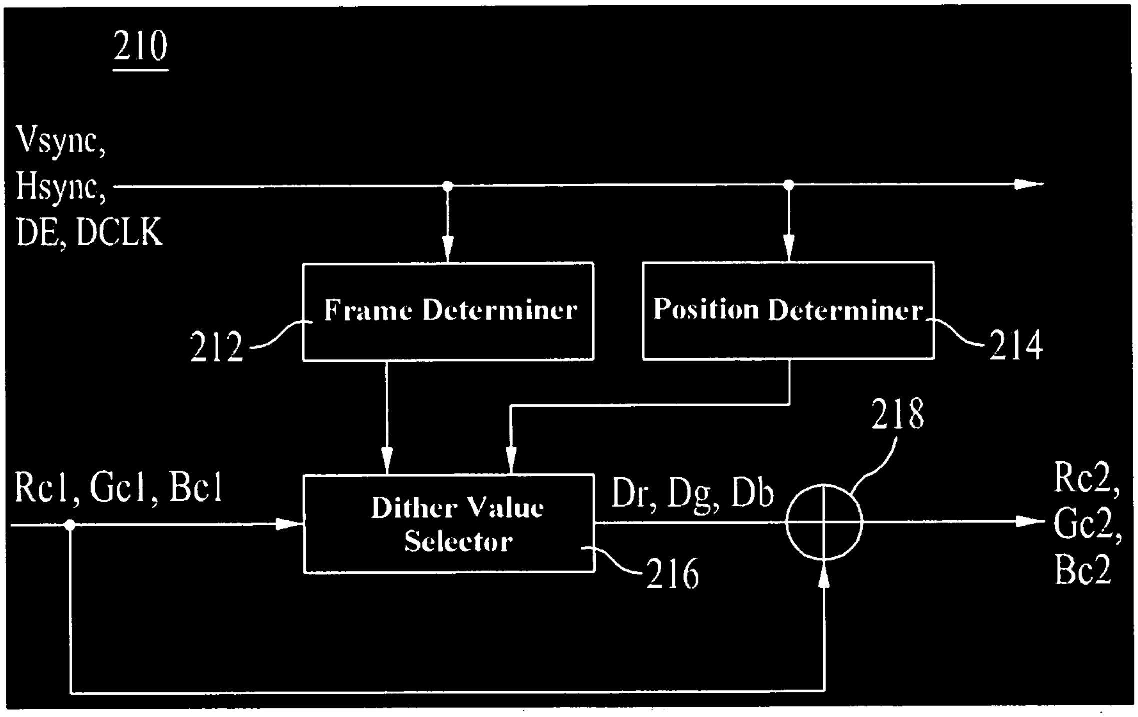
FIG. 8 is a block diagram illustrating a dithering unit shown in FIG. 2.

FIG. 8 illustrates a configuration of the dithering unit 210 included in the timing controller 200 shown in FIG. 2.

As shown in FIG. 8, the dithering unit 210 includes a position determiner 214, a dither value selector 216, and an adder 218. Where the dithering unit 210 uses an FRC dithering method, the dithering unit 210 further includes a frame determiner 212.

The frame determiner 212 counts pulses of the vertical synchronizing signal Vsync selected from among a plurality of synchronizing signals Vsync, Hsync, DE, and DCLK, to detect the number of frames. The frame determiner 212 outputs information representing the detected number of frames to the dither value selector 216.

The position determiner 214 detects respective pixel positions of input data Rc1, Gc1, and Bc1, using at least one of the synchronizing signals Vsync, Hsync, DE, and DCLK. For example, the position determiner 214 determines respective horizontal pixel positions of the input data Rc1, Gc1, and Bc1 while counting pulses of the dot clock DCLK in an enable period of the data enable signal DE, and determines respective vertical pixel positions of the input data Rc1, Gc1, and Bc1 while counting pulses of the horizontal synchronizing signal Hsync in a period in which both the vertical synchronizing signal Vsync and the data enable signal DE are enabled. The position determiner 214 outputs information representing the detected pixel positions to the dither value selector 216.

The dither value selector 216 selects desired dither values Dr, Dg, and Db from among a plurality of dither patterns, using the grayscale levels corresponding to respective lower-order bits of the data Rc1, Gc1, and Bc1 output from the compensation circuit 100 and the pixel position information output from the position determiner 214. The dither value selector 216 then outputs the selected dither values Dr, Dg, and Db. Where the dithering value selector 216 selects the dithering values Dr, Dg, and Db, using an FRC dithering method, the dithering value selector 216 additionally uses the frame number information input from the frame determiner 162.

Figure 9:
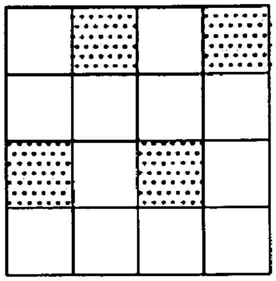
FIG. 9 is a schematic view illustrating second dither patterns of a 4*4 pixel size stored in a dither value selector shown in FIG. 8.
Figure 9:
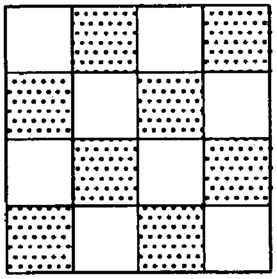
Figure 9:
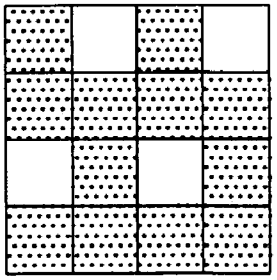
Figure 9:
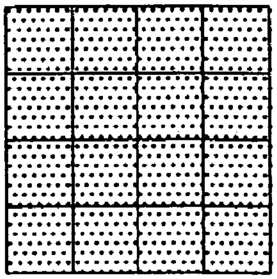

The dither value selector 216 includes a plurality of second dither patterns previously stored in the dither value selector 216 by the designer. For example, as shown in FIG. 9, the dither value selector 216 stores 4 second dither patterns each having a 4*4 pixel size, in the form of a look-up table. The second dither patterns are arranged to have gradually-increased numbers of pixels having a dither value of “1” (dot) in accordance with the grayscale levels of “1/4”, “2/4”, “3/4”, and “4/4”, respectively. Where the FRC dithering method is used, a plurality of additional second dither patterns, in which the positions of pixels having a dither value of “1” are different by frames even for the same grayscale level, may also be stored. The size of the second dither patterns and the positions of pixels having a dither value of “1” may be diversely varied in accordance with a desire of the designer.

The dithering unit 210 separates the 10 bits of each of the data Rc1, Gc1, and Bc1 input from the compensation circuit 100 into the lower-order 2 bits and the remaining 8 bits, and supplies the lower-order 2 bits to the dither value selector 216 while supplying the remaining 8 bits to the adder 218. The dither value selector 216 selects a dither pattern corresponding to the grayscale level of the separated lower-order 2 bits, from among the second dither patterns as shown in FIG. 9, and selects 1-bit dither values Dr, Dg, and Db corresponding to respective pixel positions of the input data Rc1, Gc1, and Bc1 from the selected dither pattern, using the pixel position information output from the position determiner 214. The dithering unit 210 then outputs the selected dither values Dr, Dg, and Db to the adder 218.

The adder 218 adds each of the dither values Dr, Dg, and Db selected by the dither value selector 216 to the upper-order 8 bits of the input data Rc1, Gc1, or Bc1, from which the lower-order 2 bits were separated. The adder 218 then outputs the resultant data as 8-bit compensated data Rc2, Gc2, and Bc2.

When the 10-bit data output in the first frame and the 10-bit data in the second frame have a grayscale level difference of "1" because the data input to the second compensator 180 of the compensation circuit 100 has an odd grayscale level of "1", the lower-order 2 bits of the data input to the dithering unit 210 in the first frame is different from that of the second frame. In this case, accordingly, dither values are selected from second dither patterns corresponding to the grayscale levels of the two different lower-order 2 bits, respectively. Thus, the dithering unit 210 executes a fine brightness compensation, using a combination of the second dither pattern selected in the first frame and the second dither pattern selected in the second frame.

Thus, the compensation circuit 100 of the LCD device according to the first embodiment of the present invention can prevent the first dither pattern of the compensation circuit 100 from colliding with the second dither pattern of the timing controller 200 even when the timing controller 200 has a separate dithering function.

Figure 10:
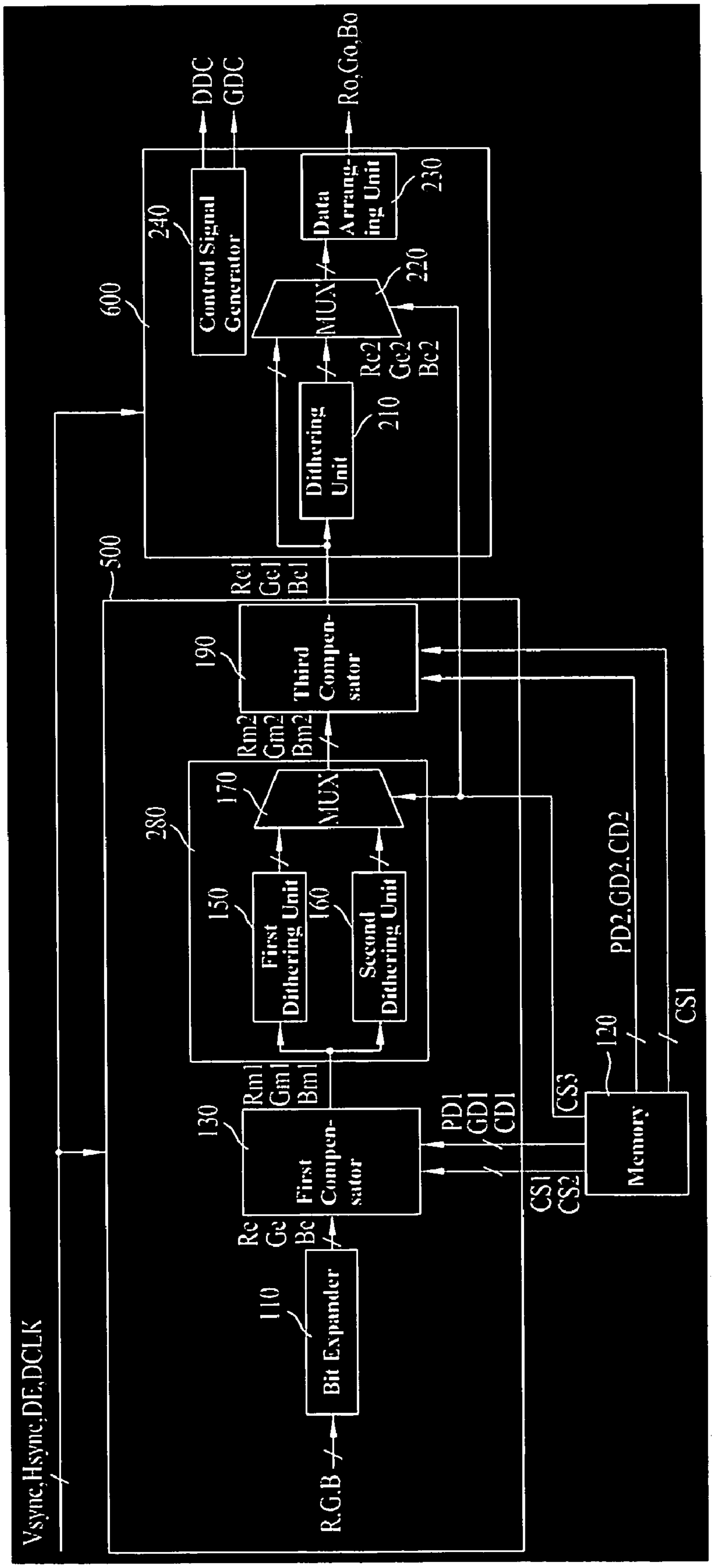
FIG. 10 is a block diagram showing exemplary configurations of a compensation circuit and a timing controller in an LCD device according to a second embodiment of the invention.

FIG. 10 is a block diagram showing exemplary configurations of a compensation circuit and a timing controller in an LCD device according to a second embodiment of the invention. Referring to FIG. 10, the compensation circuit 500 has the same configuration as the compensation circuit 100 shown in FIG. 2, except that the second compensator 280 is configured to finely compensate data compensated using a dithering method selected from different dithering methods in accordance with a dithering-ON/OFF state of the timing controller 600. The timing controller 600 shown in FIG. 10 has the same configuration as the timing controller 200 shown in FIG. 2, except that the timing controller 600 additionally includes an MUX 220 for selectively outputting data passing through the dithering unit 210 included in the timing controller 600 and data bypassing the dithering unit 210. In order to control the second compensator 280 of the compensation circuit 500 and the MUX 220 of the timing controller 500, third control information CS3 representing a dithering-ON/OFF state of the timing controller 600 is input. The third control information CS3 may also be set, using an option pin of the timing controller 600.

The bit expander 110 of the compensation circuit 100 bit-expands input data R, G, and B received from the outside of the LCD device, and supplies the bit-expanded data to the first compensator 130. For example, the bit expander 110 adds one bit ("0") to the lowermost-order bit of 10-bit input data, to bit-expand the input data to 11-bit data. The bit expander 110 then supplies the data expanded to 11 bits, namely, data Re, Ge, and Be, to the first compensator 130.

The first compensator 130 compensates the input data Re, Ge, and Be, which will be displayed on a typical defect region having defects such as vertical line defects or horizontal line defects, using the typical defect information PD1, GD1, and CD1 stored in the memory 120, and outputs the compensated data. The first compensator 130 reads the typical defect information PD1, GD1, and CD1 from the memory 120, to determine whether or not the input data Re, Ge, and Be will be displayed on a typical defect region. When it is determined that the input data Re, Ge, and Be will be displayed on a typical defect region, the first compensator 130 discriminates information as to respective grayscale ranges for the input data Re, Ge, and Be. Thereafter, the first compensator 130 selects compensation data corresponding to the discriminated grayscale range information. The first compensator 130 then executes a data compensation by adding or subtracting the selected compensation data to or from the input data Re, Ge, and Be. Thus, the first compensator 130 compensates the input data Re, Ge, and Be for the typical defect region, and outputs the compensated data. For example, the first compensator 130 adds or subtracts, to or from each of the 11-bit input data Re, Ge, and Be for the typical defect region, the corresponding 8-bit compensation data, and outputs the compensated data. The first compensator 130 outputs data for normal regions without any compensation.

The second compensator 180 finely compensates the data Rm1, Gm1, and Bm1 compensated by the first compensator 130, using a dithering method selected from different dithering methods in accordance with a dithering-ON/OFF state of the timing controller 600. For this function, the second compensator 180 includes a first dithering unit 150, a second dithering unit 160, and an MUX 170.

Figure 11:
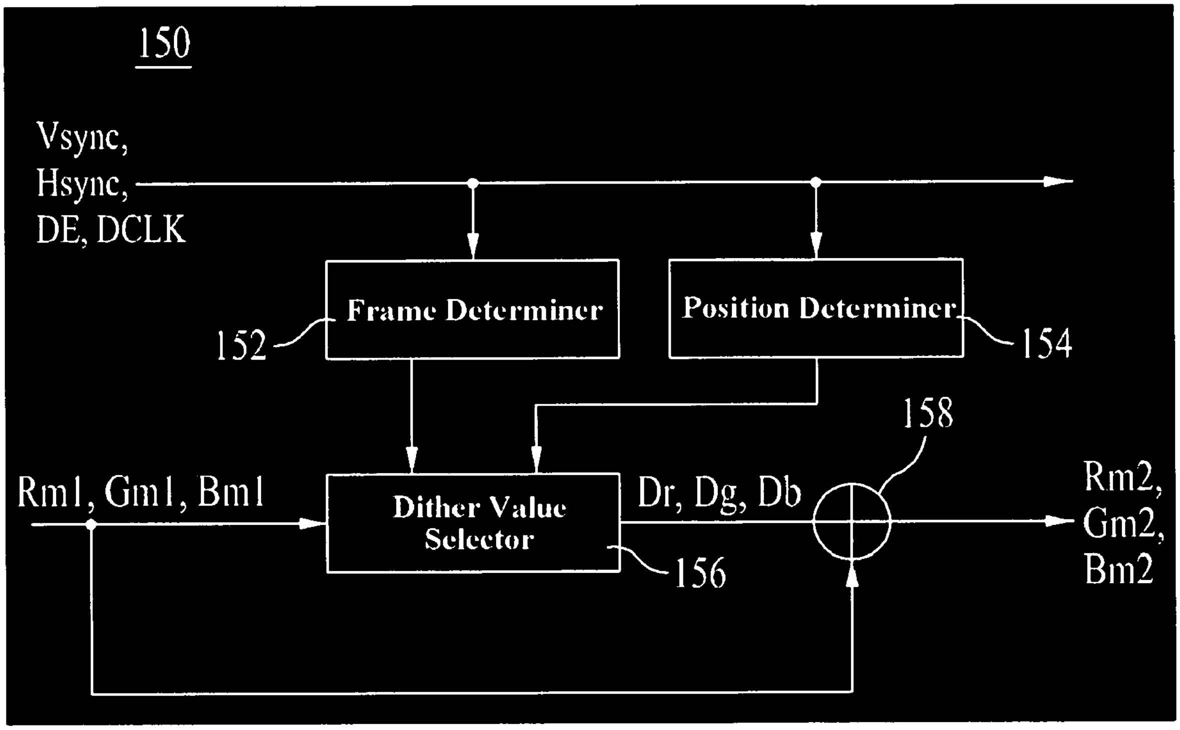
FIG. 11 is a block diagram illustrating a first dithering unit included in a second compensator shown in FIG. 10.
Figure 12A:
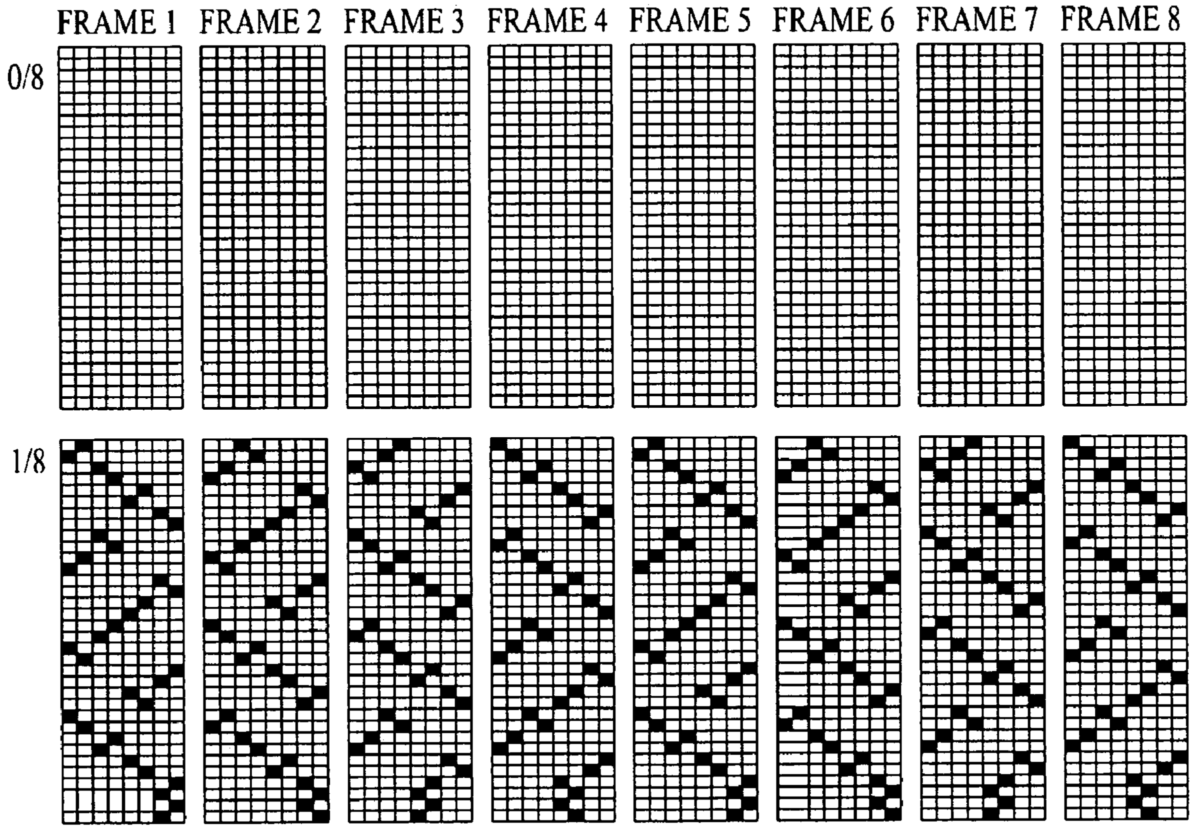
FIGS. 12A to 12D show exemplary dither patterns of an 8*32 pixel size stored in a dither value selector shown in FIG. 11.
Figure 12B:
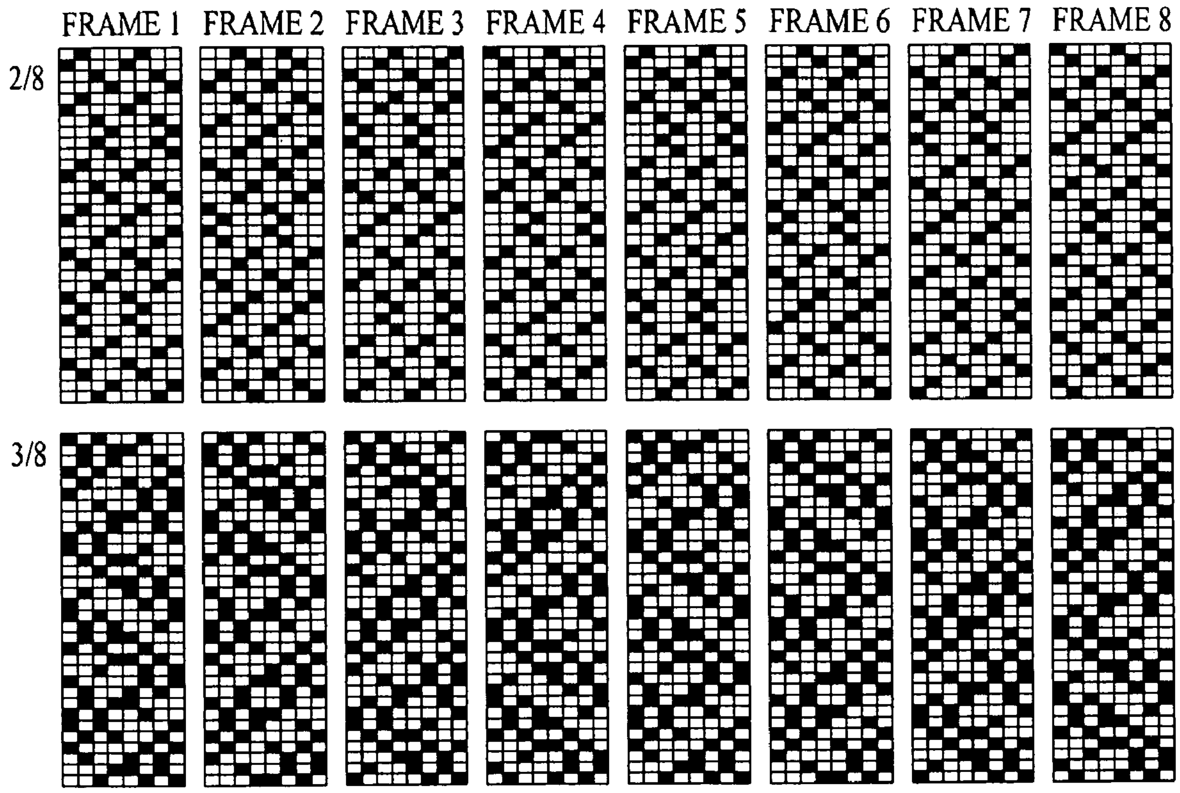
Figure 12C:
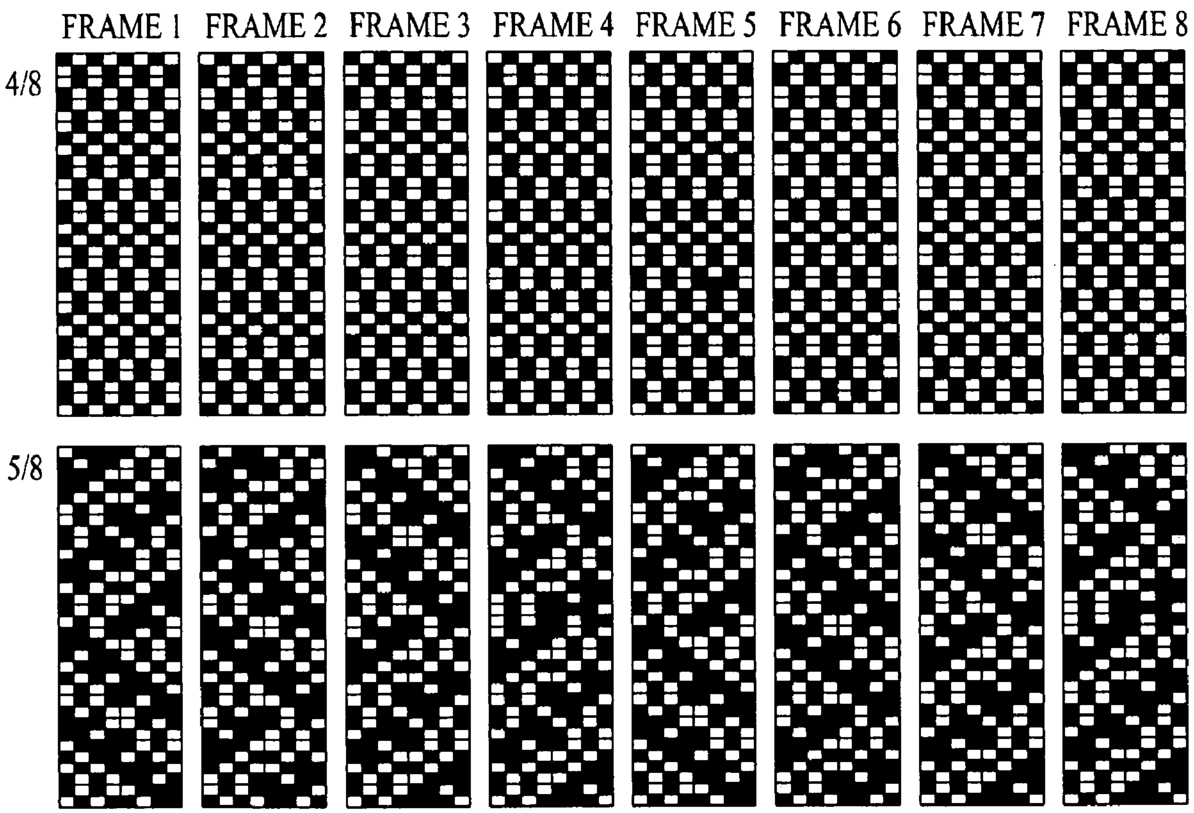
Figure 12D:
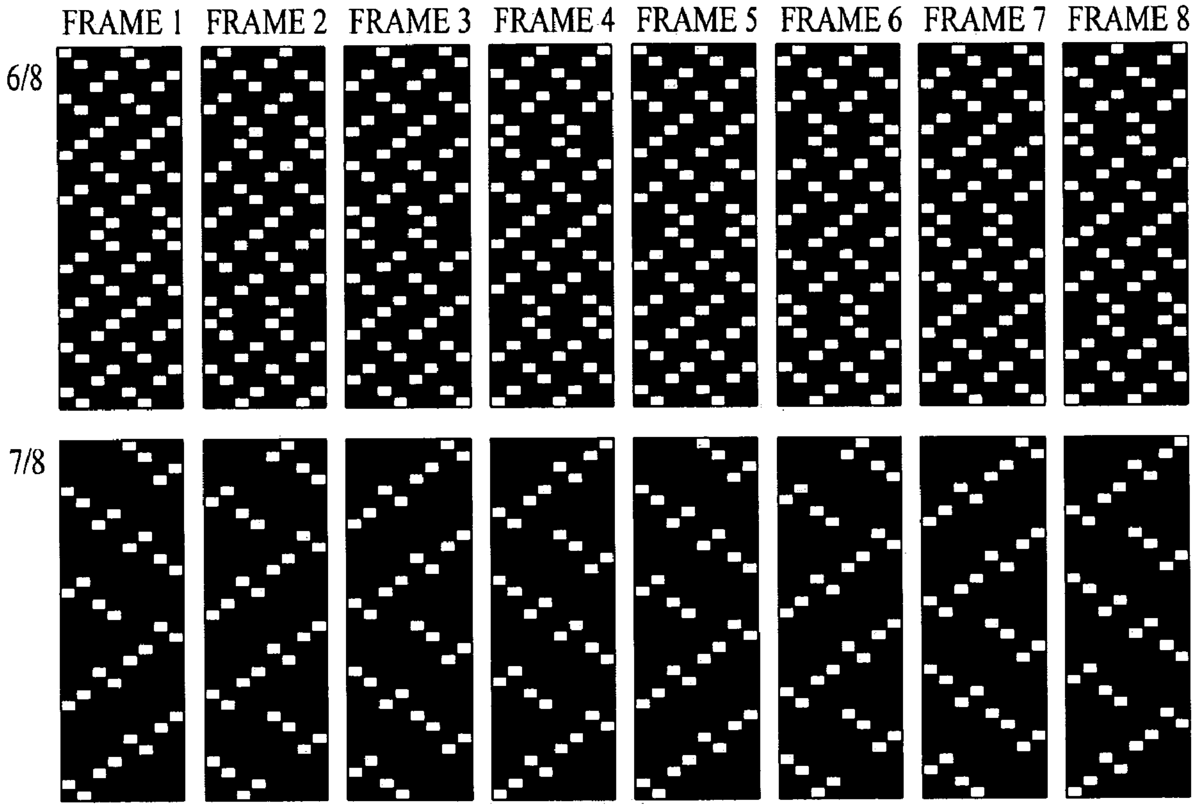

FIG. 11 is a block diagram illustrating a first dithering unit included in a second compensator shown in FIG. 10. FIGS. 12A to 12D show exemplary dither patterns of an 8*32 pixel size stored in a dither value selector shown in FIG. 11. As shown in FIG. 11, the first dithering unit 150 includes a frame determiner 152, a dither value selector 156, and an adder 158. The dither value selector 156 has a plurality of dither patterns each having an 8*32 pixel size, as shown in FIGS. 12A to 12D, so that the first dithering unit 150 can be applied to the case in which the timing controller 600 does not execute a dithering operation, namely, the timing controller 600 is in a dithering-OFF state. The second dithering unit 160 has the same configuration as the second compensator 180 of FIG. 5 so that the second dithering unit 160 can be applied to the case in which the timing controller 600 executes a dithering operation, namely, the timing controller 600 is in a dithering-ON state. Accordingly, the MUX 170 selects an output from the first dithering unit 150 when the third control information CS3 from the memory 120 represents the dithering-OFF state of the timing controller 600, and selects an output from the second dithering unit 160 when the third control information CS3 represents the dithering-ON state of the timing controller 600.

The frame determiner 152 counts pulses of the vertical synchronizing signal Vsync selected from among a plurality of synchronizing signals Vsync, Hsync, DE, and DCLK, to detect the number of frames. The frame determiner 152 outputs information representing the detected number of frames to the dither value selector 156.

The position determiner 154 detects respective horizontal pixel positions of the input data Rm1, Gm1, and Bm1 while counting pulses of the dot clock DCLK in an enable period of the data enable signal DE, and detects respective vertical pixel positions of the input data Rm1, Gm1, and Bm1 while counting pulses of the horizontal synchronizing signal Hsync in a period in which both the vertical synchronizing signal Vsync and the data enable signal DE are enabled. The position determiner 154 outputs information representing the detected pixel positions to the dither value selector 156.

The dither value selector 156 selects desired dither values Dr, Dg, and Db from among a plurality of dither patterns, using the grayscale levels corresponding to respective lower-order 3 bits of the data Rm1, Gm1, and Bm1 compensated by the first compensator 130, the frame number information input from the frame determiner 152, and the pixel position information input from the position determiner 154. The dither value selector 156 then outputs the selected dither values Dr, Dg, and Db.

For example, as shown in FIGS. 12A to 12D, the dither value selector 156 stores a plurality of dither patterns each having an 8*32 pixel size, in the form of a look-up table. The dither patterns are arranged to have gradually-increased numbers of pixels having a dither value of "1" (black) in accordance with grayscale levels of "0", "1/8", "2/8", "3/8", "4/8", "5/8", "6/8", "7/8", and "1", respectively (the dither pattern having a grayscale level of 1 is not shown). Each pixel of each dither pattern has a dither value of "1" (black) or "0" (white). A plurality of additional dither patterns, in which the positions of pixels having a dither value of "1" are different by frames even for the same grayscale level, may also be stored. That is, a plurality of additional dither patterns respectively corresponding to a plurality of frames FRAME1 to FRAME8 while being different in terms of the positions of pixels having the dither value of "1" are stored. In other words, the dither value selector 156 stores a plurality of dither patterns, which are different by grayscale levels and frames. The size of the dither patterns and the positions of pixels having a dither value of "1" in each dither pattern may be varied in accordance with a designer's desire. Since the data compensated by the first compensator 130 is spatially and temporally distributed, using the above-described dither patterns, it is possible to finely compensate for the brightness difference of the typical defect region.

The lower-order 3 bits of each 11-bit data of the data Rm1, Gm1, and Bm1 input from the first compensator 130 to the first dithering unit 150 is supplied to the dither value selector 156, and the remaining 8 bits is supplied to the adder 168. The dither value selector 156 selects one dither pattern corresponding to the grayscale level represented by the lower-order 3 bits in each of the input data Rm1, Gm1, and Bm1 and the frame number information output from the frame determiner 152, from among the dither patterns as shown in FIGS. 12A to 12D. The dither value selector 156 then selects, from the selected dither pattern, 1-bit dither values Dr, Dg, and Db corresponding to respective pixel positions of the input data Rm1, Gm1, and Bm1, using the pixel position information from the position determiner 154. The dither value selector 156 outputs the selected dither values Dr, Dg, and Db to the adder 158.

The adder 158 adds each of the dither values Dr, Dg, and Db selected by the dither value selector 156 to the upper-order 8 bits of the corresponding data Rm1, Gm1, or Bm1. The adder 158 then outputs the resultant data to the MUX 170.

The second dithering unit 160 includes a frame determiner 182, a dither value selector 186, and an adder 188, as shown in FIG. 5.

The frame determiner 182 counts pulses of the vertical synchronizing signal Vsync, to detect whether the current frame is an odd frame or an even frame. The dither value selector 186 selects a dither value of "1" or "0" from a first dither pattern, which has a 1*1 pixel size, as shown in FIG. 6, using the frame information input from the frame determiner 182, and outputs the selected dither value. The dither value selector 186 alternately outputs dither values of "1" and "0" by frames. The adder 188 discards the lowermost-order bit in the 11 bits of each of the data Rm1, Gm1, and Bm1 input from the first compensator 130 in a first frame, and then adds a first dither value of "1" or "0" selected by the dither value selector 186 to the lowermost-order bit in the remaining 10 bits. Thus, the adder 188 outputs 10-bit compensated data Rm2, Gm2, and Bm2. In a second frame, the adder 188 discards the lowermost-order bit of the 11 bits, and adds a first dither value reciprocal to that of the first frame to the lowermost-order bit of the remaining 10 bits, and then outputs the resultant 10-bit compensated data Rm2, Gm2, and Bm2.

The MUX 170 selects the output from the first dithering unit 150 when the third control information CS3 from the memory 120 represents the dithering-OFF state of the timing controller 600. On the other hand, when the third control information CS3 represents the dithering-ON state of the timing controller 600, the MUX 170 selects the output from the second dithering unit 160. The MUX 170 outputs the selected output to the third compensator 190.

The third compensator 190 compensates the data Rm2, Gm2, and Bm2, which will be displayed on a point defect region, using the point defect information PD2, GD2, and CD2 stored in the memory 120. For data of normal regions, the third compensator 190 outputs the data without any data compensation.

The dithering unit 210 of the timing controller 200 executes a fine brightness compensation by spatially and temporally distributing the data Rc1, Gc1, and Bc1 output from the compensation circuit 500 in accordance with the second dithering method. Thus, the timing controller 200 executes a fine brightness compensation for both the data of defect regions and the data of normal regions by spatially and temporally distributing the data of defect regions and the data of normal regions. For example, the second dithering unit 210 uses second dither patterns capable of preventing a collision thereof with the first dither patterns stored in the second dithering unit 160 of the second compensator 180 in the compensation circuit 500, namely, dither patterns each having a 4*4 pixel size. The dithering unit 210 separates the 10 bits of each of the data Rc1, Gc1, and Bc1 input from the compensation circuit 500 into the lower-order 2 bits and the remaining 8 bits. Thereafter, the dithering unit 210 selects a second dither value of "1" or "0" from the second dither pattern selected in accordance with the grayscale level of the separated lower-order 2 bits, and adds the selected second dither value to the lowermost-order bit of the remaining 8 bits. Thus, the dithering unit 210 outputs compensated data Rc2, Gc2, and Bc2 each consisting of 8 bits. When the 10-bit data output in the first frame and the 10-bit data in the second frame have a grayscale level difference of "1" because the data input to the second dithering unit 160 of the compensation circuit 500 has an odd grayscale level of "1", the lower-order 2 bits of the data input to the dithering unit 210 in the first frame is different from that of the second frame. In this case, accordingly, dither values are selected from second dither patterns corresponding to the grayscale levels of the two different lower-order 2 bits, respectively. Thus, the dithering unit 210 executes a fine brightness compensation, using a combination of the second dither pattern selected in the first frame and the second dither pattern selected in the second frame.

The MUX 220 selects the data Rc1, Gc1, and Bc1 directly input from the compensation unit 500 without passing through the dithering unit 210 when the third control information CS3 from the memory 120 represents the dithering-OFF state of the timing controller 600. The MUX 220 outputs the selected data Rc1, Gc1, and Bc1 to the data arranging unit 230. On the other hand, when the third control information CS3 represents the dithering-ON state of the timing controller 600, the MUX 220 selects the Rc2, Gc2, and Bc2 output from the second dithering unit 160. The MUX 220 outputs the selected data Rc2, Gc2, and Bc2 to the data arranging unit 230.

The data arranging unit 230 arranges the input data from the MUX 220, and outputs the arranged data, namely, data Ro, Go, and Bo, to the data driver 310 shown in FIG. 1.

The control signal generator 240 generates the data control signal DDC and the gate control signal GDC, and outputs the generated data control signal DDC and gate control signal GDC to the data driver 310 and gate driver 320, respectively.

Thus, the compensation circuit 500 of the LCD device according to the second embodiment of the present invention compensates data, using a dither pattern selected from different dither patterns in accordance with a dithering-ON/OFF state of the timing controller 600. Accordingly, the compensation circuit 500 can be used irrespective of whether the timing controller has a dithering function. Where the timing controller 600 has a separate dithering function, it is also possible to prevent a collision between the first dither pattern of the compensation circuit 500 and the second dither pattern of the timing controller 600.

Figure 13:
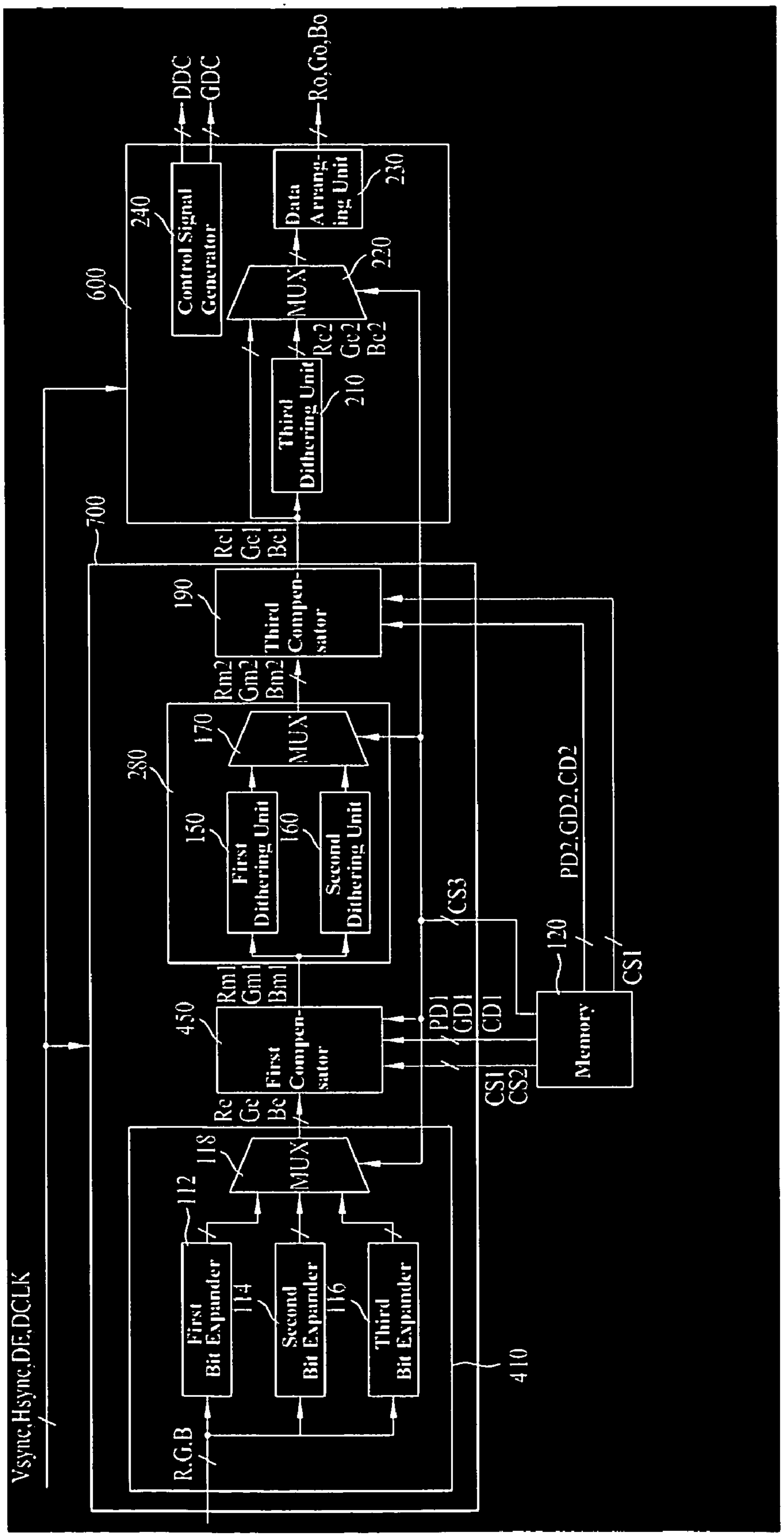
FIG. 13 is a block diagram showing exemplary configurations of a compensation circuit and a timing controller in an LCD device according to a third embodiment of the invention.

FIG. 13 is a block diagram showing exemplary configurations of a compensation circuit and a timing controller in an LCD device according to a third embodiment of the invention. The compensation circuit 700 shown in FIG. 13 has the same configuration as the compensation circuit 500 of the second embodiment shown in FIG. 10, except for a bit expander 410 and a first compensator 450, which are configured to compensate data of typical defect regions after expanding the number of bits of the data in accordance with the kind of an input source.

The compensation circuit 700 shown in FIG. 13 expands input data with respect to reference input data having a maximum number of bits such that the expanded input data has the same number of bits as the reference input data, in order to enable the compensation circuit 700 to be applied to various LCD devices, irrespective of the kind of an input source, which supplies input data having a specific number of bits or the model of an LCD device. The compensation circuit 700 expands the number of bits of the input data, using a method selected from different methods in accordance with information as to the bit number of the input data and the model of the LCD device. The compensation circuit 700 then selects and compensates the data expanded in accordance with information externally supplied from as to the number of bits and the model.

The third control information CS3 input from an external system may include dithering-ON/OFF information representing whether the timing controller 600 is of a dithering-ON model or a dithering-OFF model, and bit number information representing the number of bits of data input from an input source. For example, the bit number information of the third control information CS3 may represent 8-bit input data or 10-bit input data.

The bit expander 410 includes first to third bit expanders 112, 114, and 116, and an MUX 118 for selecting an output from those of the first to third bit expanders 112, 114, and 116.

When the first bit expander 112 receives data R, G, and B from an 8-bit input source, it adds 2 bits ("00") to each input data before an uppermost-order bit of the input data, while adding 3 bits ("000") to the input data after the lowermost-order bit of the input data, to expand the input data to 13 bits. The added upper-order 2 bits are used as dummy bits for adjusting the number of bits of the input data to be identical to a reference bit number. The added lower-order 3 bits are used as an expansion portion of compensation data for a fine brightness adjustment. When the second bit expander 114 receives data R, G, and B from a 10-bit input source, it adds 3 bits ("000") to the input data after the lowermost-order bit of the input data, to expand the input data to 13 bits. The added lower-order 3 bits are used as an expansion portion of compensation data for a fine brightness adjustment. When the third bit expander 115 receives data R, G, and B from a 10-bit input source in the dithering-ON state of the timing controller 600, it adds 2 bits ("00") to each input data before the uppermost-order bit, while adding 1 bit ("0") to the input data after the lowermost-order bit, to expand the input data to 13 bits. The added upper-order 2 bits are used as dummy bits for adjusting the number of bits of the input data to be identical to a reference bit number. The added lower-order 1 bit is used as an expansion portion of compensation data for a fine brightness adjustment. The MUX 118 selects an output from the first bit expander 112 when the third control information CS3 represents an 8-bit input, selects an output from the second bit expander 114 when the third control information CS3 represents a 10-bit input, and selects an output from the third bit expander 115 when the third control information CS3 represents a 10-bit input, and the timing controller 600 is in a dithering-ON state. The MUX 118 supplies the selected output to the first compensator 450.

Figure 14:
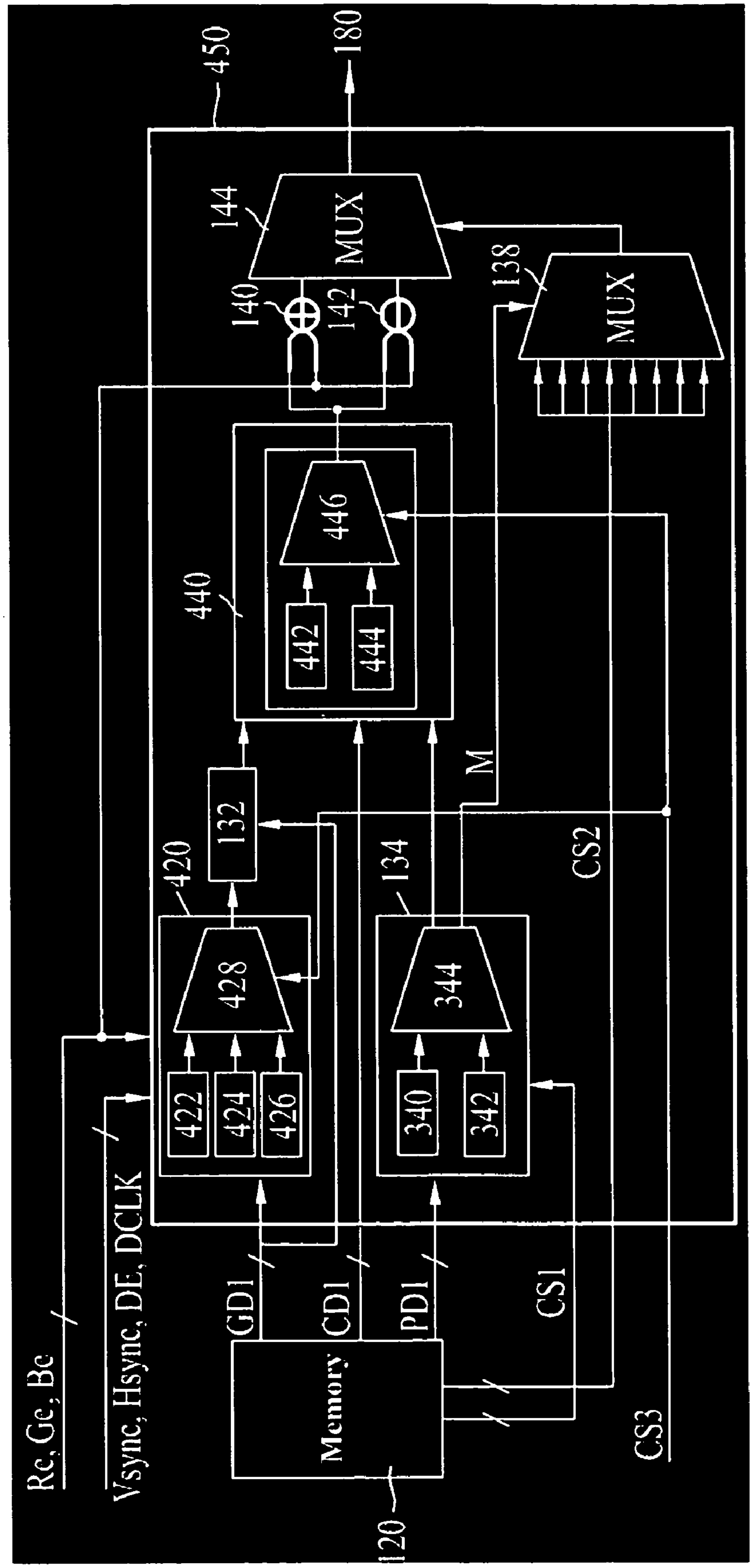
FIG. 14 is a block diagram illustrating a first compensator shown in FIG. 13.

As shown in FIG. 14, the first compensator 450 includes a data input unit 420, a grayscale determiner 132, a position determiner 134, a compensation data selector 440, an adder 140, a subtractor 142, and MUXs 138 and 144.

The data input unit 420 includes first to third data input units 422, 424, and 426 for selecting, from input data Re, Ge, and Be from the bit expander 410, data, which will be input to the grayscale determiner 132, and an MUX 428 for selecting an output from those of the first to third data input units 422, 424, and 426, and supplying the selected output to the grayscale determiner 132.

The first data input unit 422 corresponds to the first bit expander 112, so discards the 2 bits added to the 8-bit data before the uppermost-order bit, and the 3 bits added to the 8-bit data after the lowermost-order bit, to select and output effective data of 8 bits. That is, the first data input unit 422 selects 8-bit effective data [10:3] from 13-bit input data [12:0] output from the bit expander 410, and outputs the selected 8-bit effective data.

The second data input unit 424 corresponds to the second bit expander 114, so discards the 3 bits added to the 10-bit data after the lowermost-order bit, and further discards the lower-order 2 bits of the 10-bit data, to select and output effective data of 8 bits. That is, the second data input unit 424 selects 8-bit effective data [12:5] from 13-bit input data [12:0] output from the bit expander 410, and outputs the selected 8-bit effective data.

The third data input unit 426 corresponds to the third bit expander 116, so discards the 2 bits added to the 10-bit data before the uppermost-order bit, and the 1 bit added to the 10-bit data after the lowermost-order bit, to select and output effective data of 8 bits. That is, the third data input unit 426 selects 8-bit effective data [10:3] from 13-bit input data [12:0] output from the bit expander 410, and outputs the selected 8-bit effective data.

The MUX 428 selects the output from the first data input unit 422 when the third control information CS3 represents an 8-bit input, selects the output from the second data input unit 424 when the third control information CS3 represents a 10-bit input, and selects the output from the third data input unit 426 when the third control information CS3 represents a 10-bit input, and the timing controller 600 is in the dithering-ON state. The MUX 428 supplies the selected output to the grayscale determiner 132.

The grayscale determiner 132 analyzes the grayscale level of the data input from the data input unit 420, selects grayscale range information corresponding to the input data from among the grayscale range information GD1 read from the memory 120, based on the analyzed grayscale level, and outputs the selected grayscale range information to the compensation data selector 440.

The position determiner 134 determines respective pixel positions of the input data Re, Ge, and Be in a horizontal direction or in a vertical direction, using at least one of the vertical synchronizing signal Vsync, horizontal synchronizing signal Hsync, data enable signal DE, and dot clock DCLK. The position determiner 134 selects position information of the defect region corresponding to the determined pixel positions, and outputs the selected position information to the compensation data selector 440. The position determiner 134 also counts the number of detected defect regions, M, and outputs the detected defect region number M to the MUX 138. For this function, as shown in FIG. 4, the position determiner 134 includes a first position determiner 340, a second position determiner 342, and an MUX 344.

The compensation data selector 440 includes a first compensation data selector 442, a second compensation data selector 444, and an MUX 446.

Each of the first and second compensation data selectors 442 and 444 selects compensation data corresponding to input data, from among the compensation data CD1 from the memory 120, in response to the grayscale range information selected by the grayscale determiner 132 and the position information selected by the position determiner 134. The first compensation data selector 442 corresponds to the 8-bit input source and the 10-bit dithering-ON state, so adds 2 bits ("00") to the selected compensation data after the uppermost-order bit, and outputs 10-bit compensation data. The second compensation data selector 444 corresponds to the 10-bit input source, so adds 2 bits ("00") to the selected compensation data before the lowermost-order bit, and outputs 10-bit compensation data. The MUX 446 selects the output from the first compensation data selector 442 when the third control information CS3 represents an 8-bit input or a 10-bit dithering-ON state, and selects the output from the second compensation data selector 444 when the third control information CS3 represents a 10-bit input. The MUX 446 then supplies the selected output to the adder 140 and subtractor 142.

The adder 140 adds the compensation data output from the compensation data selector 136 to the input data Re, Ge, and Be, and outputs the resultant data. The subtractor 142 subtracts the compensation data output from the compensation data selector 136 from the input data Re, Ge, and Be, and outputs the resultant data.

The MUX 138 sequentially outputs the contrast information as to typical defect regions in accordance with the order of the typical defect regions, to control the MUX 144, which selects the output from the adder 140 or the output from the subtractor 142. The typical defect region contrast information is stored in the memory 120, as second control information CS2, together with the typical defect region order information. The MUX 138 selects one second control information CS2 from among a plurality of second control information CS2 read from the memory 120, in accordance with the detected typical direction region number M output from the position determiner 134, and outputs the selected second control information CS2 to the MUX 144. The MUX 144 selects the output from the adder 140 or the output from the subtractor 142 in accordance with the contrast information included in the second control information CS2 supplied from the MUX 138.

The second compensator 180 finely compensates data Rm1, Gm1, and Bm1 compensated in the first compensator 450, using a dithering method selected from different dithering methods in accordance with a dithering-ON/OFF state of the timing controller 600. As shown in FIG. 11, the first dithering unit 150 includes a frame determiner 152, a position determiner 154, a dither value selector 156, and an adder 158.

The dither value selector 156 has a plurality of dither patterns each having an 8*32 pixel size, as shown in FIGS. 12A to 12D, so that the first dithering unit 150 can be applied to the case in which the timing controller 600 is in a dithering-OFF state. Accordingly, the first dithering unit 150 can be applied to an 8-bit input source and a 10-bit input source under the condition in which the timing controller 600 is in a dithering-OFF state.

The second dithering unit 160 has the same configuration as the second compensator 180 of FIG. 5 using first dither patterns each having a 1*1 pixel size so that the second dithering unit 160 can be applied to the case in which the timing controller 600 is in a dithering-ON state. Accordingly, the MUX 170 selects an output from the first dithering unit 150 when the third control information CS3 from the memory 120 represents the dithering-OFF state of the timing controller 600, and selects an output from the second dithering unit 160 when the third control information CS3 represents the dithering-ON state of the timing controller 600.

The third compensator 190 compensates data Rm2, Gm2, and Bm2, which will be displayed on a point defect region, using the point defect information PD2, GD2, and CD2 stored in the memory 120. For data of normal regions, the third compensator 190 outputs the data without any data compensation.

The dithering unit 210 of the timing controller 600 executes a fine brightness compensation for the data Rc1, Gc1, and Bc1 input from the compensation circuit 700, using a second dither pattern capable of preventing a collision thereof with the first dither patterns stored in the second dithering unit 160 of the second compensator 280 in the compensation circuit 700, namely, a dither pattern having a 4*4 pixel size.

The MUX 220 selects the data Rc1, Gc1, and Bc1 directly input from the compensation unit 700 without passing through the dithering unit 210 when the third control information CS3 from the memory 120 represents the dithering-OFF state of the timing controller 600. The MUX 220 outputs the selected data Rc1, Gc1, and Bc1 to the data arranging unit 230. On the other hand, when the third control information CS3 represents the dithering-ON state of the timing controller 600, the MUX 220 selects the Rc2, Gc2, and Bc2 output from the second dithering unit 160. The MUX 220 outputs the selected data Rc2, Gc2, and Bc2 to the data arranging unit 230.

The data arranging unit 230 arranges the input data from the MUX 220, and outputs the arranged data, namely, data Ro, Go, and Bo, to the data driver 310 shown in FIG. 1.

The control signal generator 240 generates the data control signal DDC and the gate control signal GDC, and outputs the generated data control signal DDC and gate control signal GDC to the data driver 310 and gate driver 320, respectively.

Thus, the compensation circuit 700 of the LCD device according to the third embodiment of the present invention expands input data with respect to reference input data having a maximum number of bits such that the expanded input data has the same number of bits as the reference input data, in order to conduct a grayscale range discrimination in any case, using the upper-order 8 bits, and to apply the 8-bit compensation data from the memory 120 to an 8-bit input source and a 10-bit input source in different manners, respectively. Accordingly, it is possible to reduce the memory capacity. Also, the compensation circuit 700 can be used in any system, for example, a system using an 8-bit input source, a system using a 10-bit input source, or a system using a 10-bit input source in a dithering-ON state of the timing controller 600, irrespective of the kind of the system. The compensation circuit 700 can also be used, irrespective of whether or not the timing controller has a dithering function, because the data compensation is achieved using a dither pattern selected from different dither patterns in accordance with the dithering-ON/OFF state of the timing controller 600. Where the timing controller 600 has a separate dithering function, the compensation circuit 700 can prevent a collision between the first dither pattern of the compensation circuit 700 and the second dither pattern of the timing controller 600.

The following Table 1 shows that, in each of the compensation circuits 500 and 700 shown in FIGS. 10 and 13, the compensation effects obtained by the first dither pattern of the 1*1 size applied to the second dithering unit 160 of the second compensator 280 and the second dither pattern of 4*4 size applied to the dithering unit 210 of the timing controller 600 are equal to the compensation effects obtained by the 8*32 dither pattern applied to the first dithering unit 150 of the second compensator 280.

TABLE 1

| Compensation Value | 8-Bit Input | 10-Bit Input & 10-Bit Dithering | Remark |
|---|---|---|---|
| 1 | ⅛ Pattern | Combination of 0/4 and ¼ Patterns | The same compensation effects are obtained from two algorithms when the same compensation value is applied. |
| 2 | 2/8 Pattern | ¼ Pattern | |
| 3 | ⅜ Pattern | Combination of ¼ and 2/4 Patterns | |
| 4 | 4/8 Pattern | 2/4 Pattern | |
| 5 | ⅝ Pattern | Combination of 2/4 and ¾ Patterns | |
| 6 | 6/8 Pattern | ¾ Pattern | |
| 7 | ⅞ Pattern | Combination of ¾ and 4/4 Patterns | |

As shown in Table 1, the compensation value by the 8*32 dither pattern of the first dithering unit 150 applied to the 8-bit input source is determined by a 1/8, 2/8, 3/8, 4/8, 5/8, 6/8, or 7/8 dither pattern corresponding to the lower-order 3-bit data. The compensation value by a combination of the 0/4 dither pattern of the first frame and the 1/4 dither pattern of the second frame in the case applied to the 10-bit input source in the dithering-ON state of the dithering unit 210 of the timing controller 600 ((0/4+1/4)*(1/2)=1/8) is equal to the compensation value by the 1/8 dither pattern of the first dithering unit 150. In the same manner, the compensation value by a combination of the 1/4 dither pattern and 1/4 dither pattern ((1/4+1/4)*(1/2)=1/4) is equal to the compensation value by the 2/8 dither pattern. The compensation value by a combination of the 1/4 dither pattern and 2/4 dither pattern ((1/4+2/4)*(1/2)=3/8) is equal to the compensation value by the 3/8 dither pattern. The compensation value by a combination of the 2/4 dither pattern and 2/4 dither pattern ((2/4+2/4)*(1/2)=2/4) is equal to the compensation value by the 4/8 dither pattern. The compensation value by a combination of the 2/4 dither pattern and 3/4 dither pattern ((2/4+3/4)*(1/2)=5/8) is equal to the compensation value by the 5/8 dither pattern. The compensation value by a combination of the 3/4 dither pattern and 3/4 dither pattern ((3/4+3/4)*(1/2)=3/4) is equal to the compensation value by the 6/8 dither pattern. The compensation value by a combination of the 3/4 dither pattern and 4/4 dither pattern ((3/4+4/4)*(1/2)=7/8) is equal to the compensation value by the 7/8 dither pattern. Accordingly, it can be seen that different dither patterns adjacent to each other are used in the first and second frames, respectively, for the second dither pattern of the timing controller 600 when data, to which the first dither pattern of the 1*1 size is applied in the second dithering unit 160 of the second compensator 280, has an odd value, whereas the same dither pattern is used in the first and second frames when the data has an even value.

The above-described compensation circuit according to each embodiment of the present invention can be applied not only to an LCD device, but also to other video display devices such as OLED and PDP devices.

Where the timing controller has a separate dithering function, the compensation circuit of the liquid crystal display device according to the present invention can prevent a collision between the first dither pattern of the compensation circuit and the second dither pattern of the timing controller by executing a fine brightness compensation using a combination of the first dither pattern of the compensation circuit and the second dither pattern of the timing controller The compensation circuit of the liquid crystal display device according to the present invention compensates data, using a dither pattern selected from different dither patterns in accordance with a dithering-ON/OFF state of the timing controller. Accordingly, the compensation circuit can be used irrespective of whether the timing controller has a dithering function.

The compensation circuit of the liquid crystal display device according to the present invention expands input data with respect to reference input data having a maximum number of bits such that the expanded input data has the same number of bits as the reference input data, in order to conduct a grayscale range discrimination in any case, using the upper-order 8 bits, and to apply the 8-bit compensation data from the memory to an 8-bit input source and a 10-bit input source in different manners, respectively. Accordingly, it is possible to reduce the memory capacity. Also, the compensation circuit can be used in any system, for example, a system using an 8-bit input source, a system using a 10-bit input source, or a system using a 10-bit input source in a dithering-ON state of the timing controller, irrespective of the kind of the system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents

What is claimed is:

1. A video display device, comprising:

a display panel;

a memory storing typical defect information used to compensate input data to be displayed on typical defect regions of the display panel;

a compensation circuit comprising a first compensator for compensating the input data to be displayed on the typical defect regions, using the typical defect information from the memory, and a second compensator for finely compensating the data compensated by the first compensator, using a first dither pattern, the compensation circuit supplying data to be displayed on normal regions, without compensation;

a timing controller comprising a dithering unit for finely compensating data output from the compensation circuit, using a second dither pattern having a size larger than a size of the first dither pattern; and a panel driver for driving the display panel under a control of the timing controller, wherein the first compensator comprises:

a grayscale determiner for selecting grayscale range information corresponding to the input data, using grayscale range information included in the typical defect information stored in the memory, and outputting the selected grayscale range information, a position determiner for outputting position information as to a defect region corresponding to the input data and a number of detected typical defect regions, in accordance with defect region position information from the memory, a compensation data selector for selecting compensation data corresponding to the input data from among compensation data for defect regions stored in the memory, using the grayscale range information output from the grayscale determiner and the position information output from the position determiner and outputting the compensation data;

an adder for adding the compensation data output from the compensation data selector to the input data, a subtractor for subtracting the compensation data output from the compensation data selector to the input data, a first multiplexer for selectively outputting typical region order information and contrast information stored in the memory in accordance with the number of detected typical defect regions output from the position determiner, and a second multiplexer for selecting an output from the adder or an output from the subtractor in accordance with the typical defect region order information and the contrast information selected by the first multiplexer.

2. The video display device according to claim 1, wherein:

the second compensator of the compensation circuit executes a first dithering operation for N-bit input data ("N" is a positive integer), using a dither pattern having a 1*1 pixel size as the first dither pattern, thereby outputting "N−1"-bit data reduced from the N-bit input data by a lowermost-order 1 bit; and the dithering unit of the timing controller executes a second dithering operation for the "N−1"-bit data, using a dither pattern having a 4*4 pixel size as the second dither pattern, thereby outputting "N-3"-bit data reduced from the "N−1"-bit data by lowermost-order 2 bits, and determines a compensation value in accordance with a combination of second dither patterns respectively selected in adjacent two frames.

3. The video display device according to claim 1, wherein:

the memory further stores point defect information as to point defect regions of the display panel; and the compensation circuit further comprises a third compensator for compensating data input from the second compensator, using the point defect information from the memory.

4. A video display device, comprising:

a display panel;

a memory storing typical defect information used to compensate input data to be displayed on typical defect regions of the display panel;

a compensation circuit comprising a first compensator for compensating the input data to be displayed on the typical defect regions, using the typical defect information from the memory, and a second compensator for finely compensating the data compensated by the first compensator, using a first dither pattern selected from different first dither patterns in response to dithering-ON/OFF information, the compensation circuit supplying data to be displayed on normal regions, without compensation;

a timing controller comprising a dithering unit for finely compensating data output from the compensation circuit, using a second dither pattern having a size larger than a size of the first dither pattern, and a passing selection multiplexer for selecting an output from the dithering unit or an output from the compensation circuit in response to the dithering-ON/OFF information; and a panel driver for driving the display panel under a control of the timing controller, wherein the first compensator comprises:

a grayscale determiner for selecting grayscale range information corresponding to the input data, using grayscale range information included in the typical defect information stored in the memory, and outputting the selected grayscale range information, a position determiner for outputting position information as to a defect region corresponding to the input data and a number of detected typical defect regions, in accordance with defect region position information from the memory, a compensation data selector for selecting compensation data corresponding to the input data from among compensation data for defect regions stored in the memory, using the grayscale range information output from the grayscale determiner and the position information output from the position determiner and outputting the compensation data, an adder for adding the compensation data output from the compensation data selector to the input data, a subtractor for subtracting the compensation data output from the compensation data selector to the input data, a first multiplexer for selectively outputting typical region order information and contrast information stored in the memory in accordance with the number of detected typical defect regions output from the position determiner, and a second multiplexer for selecting an output from the adder or an output from the subtractor in accordance with the typical defect region order information and the contrast information selected by the first multiplexer.

5. The video display device according to claim 4, wherein:

the second compensator of the compensation circuit comprises:

a first dithering unit for executing a dithering operation for N-bit input data ("N" is a positive integer) received from the first compensator, using a dither pattern having a 8*32 pixel size as the first dither pattern, thereby outputting "N−3"-bit data reduced from the N-bit input data by lowermost-order 3 bits;

a second dithering unit for executing a dithering operation for the N-bit input data received from the first compensator, using a dither pattern having a 1*1 pixel size as the first dither pattern, thereby outputting "N−1"-bit data reduced from the N-bit input data by a lowermost-order 1 bit; and a dithering selection multiplexer for selecting an output from the first dithering unit when the dithering-ON/OFF information representing whether the timing controller is in a dithering-ON state or a dithering-OFF state represents the dithering-OFF state of the timing controller, and selecting an output from the second dithering unit when the dithering-ON/OFF information represents the dithering-ON state of the timing controller; and the dithering unit of the timing controller executes a second dithering operation for the “N−1”-bit data, using a dither pattern having a 4*4 pixel size as the second dither pattern, thereby outputting “N−3”-bit data reduced from the “N−1”-bit data by lowermost-order 2 bits, and determines a compensation value in accordance with a combination of second dither patterns respectively selected in adjacent two frames.

6. The video display device according to claim 4, wherein:

the memory further stores point defect information as to point defect regions of the display panel; and the compensation circuit further comprises a third compensator for compensating data input from the second compensator, using the point defect information from the memory.

7. A video display device, comprising:

a display panel;

a memory storing typical defect information used to compensate data to be displayed on typical defect regions of the display panel;

a compensation circuit comprising a bit expander for bit-expanding input data pieces respectively having different numbers of bits such that the input data pieces have the same number of bits, in accordance with control information including input source information and dithering-ON/OFF information, and outputting the resultant data, a first compensator for compensating the data input from the bit expander to be displayed on the typical defect regions, using the control information, and a second compensator for finely compensating the data compensated by the first compensator, using a first dither pattern selected from different first dither patterns in response to dithering-ON/OFF information, the compensation circuit supplying data to be displayed on normal regions, without compensation;

a timing controller comprising a dithering unit for finely compensating data output from the compensation circuit, using a second dither pattern having a size larger than a size of the first dither pattern, and a passing selection multiplexer for selecting an output from the dithering unit or an output from the compensation circuit in response to the dithering-ON/OFF information; and a panel driver for driving the display panel under a control of the timing controller, wherein the first compensator comprises:

a grayscale determiner for selecting grayscale range information corresponding to the data input from the bit expander, using grayscale range information included in the typical defect information stored in the memory, and outputting the selected grayscale range information, a position determiner for outputting position information as to a defect region corresponding to the data input from the bit expander and a number of detected typical defect regions, in accordance with defect region position information from the memory, a compensation data selector for selecting compensation data corresponding to the data, input from the bit expander, from among compensation data for defect regions stored in the memory, using the grayscale range information output from the grayscale determiner and the position information output from the position determiner and outputting the compensation data, an adder for adding the compensation data output from the compensation data selector to the input data, a subtractor for subtracting the compensation data output from the compensation data selector to the input data, a first multiplexer for selectively outputting typical region order information and contrast information stored in the memory in accordance with the number of detected typical defect regions output from the position determiner, and a second multiplexer for selecting an output from the adder or an output from the subtractor in accordance with the typical defect region order information and the contrast information selected by the first multiplexer.

8. The video display device according to claim 7, wherein the bit expander comprises:

a first bit expander for expanding 8-bit input data received from an outside of the device from 8 bits to 13 bits by adding 2 bits (“00”) to the 8-bit input data before an uppermost-order bit of the 8-bit input data, and adding 3 bits (“000”) to the 8-bit input data after a lowermost-order bit of the 8-bit input data;

a second bit expander for expanding 10-bit input data received from the outside of the device from 10 bits to 13 bits by adding 3 bits (“000”) to the 10-bit input data after a lowermost-order bit of the 10-bit input data;

a third bit expander for expanding 10-bit input data received from the outside of the device from 10 bits to 13 bits by adding 2 bits (“00”) to the 10-bit input data before an uppermost-order bit of the 10-bit input data, and adding 1 bit (“0”) to the 10-bit input data after a lowermost-order bit of the 10-bit input data; and a bit expander selection multiplexer for selecting an output from the first bit expander when the control information represents a 8-bit input source, selecting an output from the second bit expander when the control information represents a 10-bit input source, and selecting an output from the third bit expander when the control information represents the 10-bit input source and a dithering-ON state.

9. The video display device according to claim 8, wherein the first compensator further comprises:

a data input unit for selecting, from the 13-bit data input from the bit expander, 8-bit effective data to be used for a grayscale range discrimination, and outputting the selected effective data, wherein the compensation data selector bit expands the selected compensation data and outputs the bit-expanded compensation data.

10. The video display device according to claim 9, wherein:

when the control information represents the 8-bit input source or the dithering-ON state, the compensation data selector adds 2bits (“00”) to the compensation data after an uppermost-order bit of the compensation data, and outputs the resultant compensation data; and when the control information represents the 10-bit input source, the compensation data selector adds 2 bits (“00”) to the compensation data before a lowermost-order bit of the compensation data, and outputs the resultant compensation data.

11. The video display device according to claim 7, wherein:

the second compensator of the compensation circuit comprises:

a first dithering unit for executing a dithering operation for N-bit input data (“N” is a positive integer) received from the first compensator, using a dither pattern having a 8*32 pixel size as the first dither pattern, thereby outputting "N−3"-bit data reduced from the N-bit input data by lowermost-order 3 bits;

a second dithering unit for executing a dithering operation for the N-bit input data received from the first compensator, using a dither pattern having a 1*1 pixel size as the first dither pattern, thereby outputting "N−1"-bit data reduced from the N-bit input data by a lowermost-order 1 bit; and a dithering selection multiplexer for selecting an output from the first dithering unit when the dithering-ON/OFF information representing whether the timing controller is in a dithering-ON state or a dithering-OFF state represents the dithering-OFF state of the timing controller, and selecting an output from the second dithering unit when the dithering-ON/OFF information represents the dithering-ON state of the timing controller; and the dithering unit of the timing controller executes a second dithering operation for the "N−1"-bit data, using a dither pattern having a 4*4 pixel size as the second dither pattern, thereby outputting "N−3"-bit data reduced from the "N−1"-bit data by lowermost-order 2 bits, and determines a compensation value in accordance with a combination of second dither patterns respectively selected in adjacent two frames.

12. The video display device according to claim 7, wherein:

the memory further stores point defect information as to point defect regions of the display panel; and the compensation circuit further comprises a third compensator for compensating data input from the second compensator, using the point defect information from the memory.

* * * * *